US012450356B2

(12) United States Patent
Lu

(10) Patent No.: US 12,450,356 B2
(45) Date of Patent: Oct. 21, 2025

(54) METHOD FOR IMPLEMENTING REPLACING A STARTUP SCREEN OF A SMART POS DEVICE AND APPARATUS THEREOF

(71) Applicant: Feitian Technologies Co., Ltd., Beijing (CN)

(72) Inventor: Zhou Lu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 96 days.

(21) Appl. No.: 18/694,418

(22) PCT Filed: Sep. 2, 2022

(86) PCT No.: PCT/CN2022/116865
§ 371 (c)(1),
(2) Date: Mar. 22, 2024

(87) PCT Pub. No.: WO2023/061099
PCT Pub. Date: Apr. 20, 2023

(65) Prior Publication Data
US 2024/0394372 A1    Nov. 28, 2024

(30) Foreign Application Priority Data
Oct. 14, 2021    (CN) .......................... 202111194937.3

(51) Int. Cl.
*G06F 1/24*    (2006.01)
*G06F 8/61*    (2018.01)
(Continued)

(52) U.S. Cl.
CPC .............. *G06F 21/572* (2013.01); *G06F 8/63* (2013.01); *G06F 21/602* (2013.01); *G06F 21/64* (2013.01); *G06F 9/4401* (2013.01)

(58) Field of Classification Search
CPC ........ G06F 21/572; G06F 8/63; G06F 21/602; G06F 21/64; G06F 9/451
(Continued)

(56) References Cited

U.S. PATENT DOCUMENTS

| 6,934,725 | B1* | 8/2005 | Dings ................. G06F 11/1466 707/648 |
| 8,832,421 | B2* | 9/2014 | Salomone ............. G06F 9/4401 455/418 |

(Continued)

FOREIGN PATENT DOCUMENTS

| CN | 102253850 | 11/2011 |
| CN | 102866901 | 1/2013 |

(Continued)

OTHER PUBLICATIONS

"Office Action of China Counterpart Application" with English translation thereof, issued on Nov. 23, 2021, p. 1- p. 15.

(Continued)

*Primary Examiner* — Volvik Derose
(74) *Attorney, Agent, or Firm* — JCIPRNET

(57) ABSTRACT

A method for implementing replacing a startup screen of a smart POS device includes: checking, by the smart POS device, whether an updating screen completing flag exists when detecting a startup, if yes, displaying a corresponding startup screen according to a mirror file in a backup partition, otherwise, displaying a default startup screen according to a screen mirror file in a default startup screen partition; decrypting a received image data ciphertext by using a protection key, verifying data obtained by decrypting, if successful, generating a mirror file of the startup screen according to the data and storing the mirror file; applying for writing access to the backup partition; if the backup partition has a writing permission, clearing the updating screen completing flag and starting to write the stored mirror file in the (Continued)

backup partition; setting the updating screen completing flag after the mirror file is written in the backup partition.

20 Claims, 13 Drawing Sheets

(51) Int. Cl.
  *G06F 21/57* (2013.01)
  *G06F 21/60* (2013.01)
  *G06F 21/64* (2013.01)
  *G06F 9/4401* (2018.01)

(58) Field of Classification Search
  USPC .......................................................... 713/2
  See application file for complete search history.

(56) References Cited

U.S. PATENT DOCUMENTS

| | | | | |
|---|---|---|---|---|
| 2001/0029488 | A1* | 10/2001 | Takeshima | H04M 17/106 705/41 |
| 2004/0117358 | A1* | 6/2004 | von Kaenel | G06Q 40/08 |
| 2011/0173235 | A1* | 7/2011 | Aman | G06V 40/23 707/E17.055 |
| 2015/0254941 | A1* | 9/2015 | Shimazaki | G07G 1/12 705/17 |
| 2018/0338057 | A1* | 11/2018 | Ito | H04N 1/00891 |
| 2019/0312720 | A1* | 10/2019 | Liu | H04L 9/083 |
| 2021/0264809 | A1* | 8/2021 | Ogawa | G06F 3/14 |
| 2022/0129876 | A1* | 4/2022 | Fernando | G06F 3/0487 |
| 2025/0208809 | A1* | 6/2025 | Yamamoto | G06F 3/04845 |

FOREIGN PATENT DOCUMENTS

| | | |
|---|---|---|
| CN | 103294486 | 9/2013 |
| CN | 108829423 | 11/2018 |
| CN | 109871679 | 6/2019 |
| CN | 110764825 | 2/2020 |
| CN | 112099863 | 12/2020 |
| CN | 113268784 | 8/2021 |
| CN | 113642008 | 11/2021 |

OTHER PUBLICATIONS

"Notice of Allowance of China Counterpart Application," issued on Dec. 7, 2021, with English translation thereof, pp. 1-5.

"International Search Report (Form PCT/ISA/210) of PCT/CN2022/116865," mailed on Nov. 25, 2022, with English translation thereof, pp. 1-6.

"Written Opinion of the International Searching Authority (Form PCT/ISA/237) of PCT/CN2022/116865," mailed on Nov. 25, 2022, with English translation thereof, pp. 1-7.

* cited by examiner

METHOD FOR IMPLEMENTING REPLACING A STARTUP SCREEN OF A SMART POS DEVICE AND APPARATUS THEREOF

CROSS-REFERENCE TO RELATED APPLICATIONS

This application is a national stage of International Application No. PCT/CN2022/116865, filed on Sep. 2, 2022, which claims priority to Chinese Patent Application No. 202111194937.3, titled "METHOD FOR IMPLEMENTING REPLACING A STARTUP SCREEN OF A SMART POS DEVICE AND AN APPARATUS THEREOF", filed to China National Intellectual Property Administration on Oct. 14, 2021. Both of the aforementioned applications are hereby incorporated by reference in their entireties.

TECHNICAL FIELD

The present disclosure relates to information security field, more particularly to a method for implementing replacing a startup screen of a smart POS device and an apparatus thereof.

BACKGROUND

In prior art, a startup screen of a smart POS device with Android system is decided by burning firmware of a POS device manufacturer before the smart POS device leaves factory. Because a smart POS device with Android system has no backup partition, therefore the smart POS device with Android system and the firmware should be updated together if a client has a request of updating the startup screen, for example, for brand promotion. In this way, the startup screen of the smart POS device can not be changed flexibly according to the requirement of the client. Each time of changing the startup screen requires firmware updating. Repeat updating the firmware requires complicated operating and leads to risk of replacing a startup screen with malicious purpose. Therefore, a safe and convenient method for implementing replacing a startup screen is required urgently.

SUMMARY

The purpose of the present disclosure is to overcome deficiency of the prior art and provide a method for implementing replacing a startup screen of a smart POS device and an apparatus thereof.

According to a first aspect, the present disclosure provides a method for implementing replacing a startup screen of a smart POS device, including:

StepS1: checking, by the smart POS device, whether an updating screen completing flag exists when detecting a startup, if yes, executing StepS3, otherwise, executing StepS2;

StepS2: reading, by the smart POS device, a screen mirror file from a default startup screen partition and taking the screen mirror file as a parameter, invoking a display driver program to display a default startup screen, executing StepS4;

StepS3: reading, by the smart POS device, a mirror file from a backup partition and taking the mirror file as a parameter, invoking the display driver program to display a corresponding startup screen, executing StepS4;

StepS4: decrypting, by the smart POS device, an image data ciphertext by using a stored protection key when receiving the image data ciphertext, if decrypting is successful, executing StepS5;

StepS5: verifying, by the smart POS device, data obtained by successful decrypting, if verifying is successful, executing StepS6, if verifying is failed, reporting an error;

StepS6: generating, by the smart POS device, a mirror file of the startup screen according to the data obtained by successful decrypting and storing the mirror file;

StepS7: applying, by the smart POS device, for writing to the backup partition, and determining whether has a writing permission of the backup partition, if yes, executing StepS8; otherwise, reporting an error;

StepS8: clearing, by the smart POS device, the updating screen completing flag and starting to write the stored mirror file in the backup partition;

StepS9: determining, by the smart POS device, whether the mirror file is written in the backup partition completely, if yes, executing StepS10, otherwise, reporting an error;

StepS10: setting, by the smart POS device, the updating screen completing flag.

According to a second aspect, the present disclosure also provides a smart POS device, including at least one processor, a storage and an instruction which is stored in the storage and executed by the at least one processor, wherein the at least one processor executes the instruction, to implement the method for implementing replacing a startup screen of a smart POS device.

According to a third aspect, the present disclosure provides a computer readable storage medium or a chip, the computer readable storage medium includes a computer program, when the computer program runs on a smart POS device, the smart POS device performs the method of for implementing replacing a startup screen of a smart POS device; the chip is coupled to a storage, which is configured to executes a computer program stored in the storage so as to perform the method of for implementing replacing a startup screen of a smart POS device described above.

Compared with the prior art, the present disclosure has following advantages:

the technical solution of the present disclosure sets a backup partition, when the smart POS device starts up, the smart POS device can replace a startup screen independently according to the mirror file of the backup partition and no updating firmware is required, this operating is safe, convenient and fast, and product competitiveness is improved. In addition, a user can replace the startup screen at any time, which is convenient to use; the data received by the smart POS device is the data after being encrypted by the server, which makes a process of replacing the startup screen be safer and reliable.

DESCRIPTION OF EMBODIMENTS

The present application provides a method for implementing replacing a startup screen of a smart POS device and an apparatus. The following is a detailed explanation of the specific implementation of the present application, with reference to the accompanying drawings. The examples of the embodiments are illustrated in the accompanying drawings. The embodiments described below with reference to the accompanying drawings are exemplary and are used to explain the present application, rather than being interpreted as limiting the present application.

The person skilled in the art can understand that, unless defined otherwise, all terms (including technical and scientific terms) used herein have the same meaning as commonly understood by one of ordinary skill in the art to which the present application belongs. It should be also understood that terms defined in a general dictionary may be interpreted with the same meaning as the meaning in the context of the prior art and are not to be interpreted to have ideal or excessively formal meanings unless specifically defined as such.

In order to make the purpose, technical solution and advantage of the present disclosure clearer, the following is a further detailed description of the implementation of the present disclosure in conjunction with the accompanying drawings.

Embodiment 1

Figure 1:
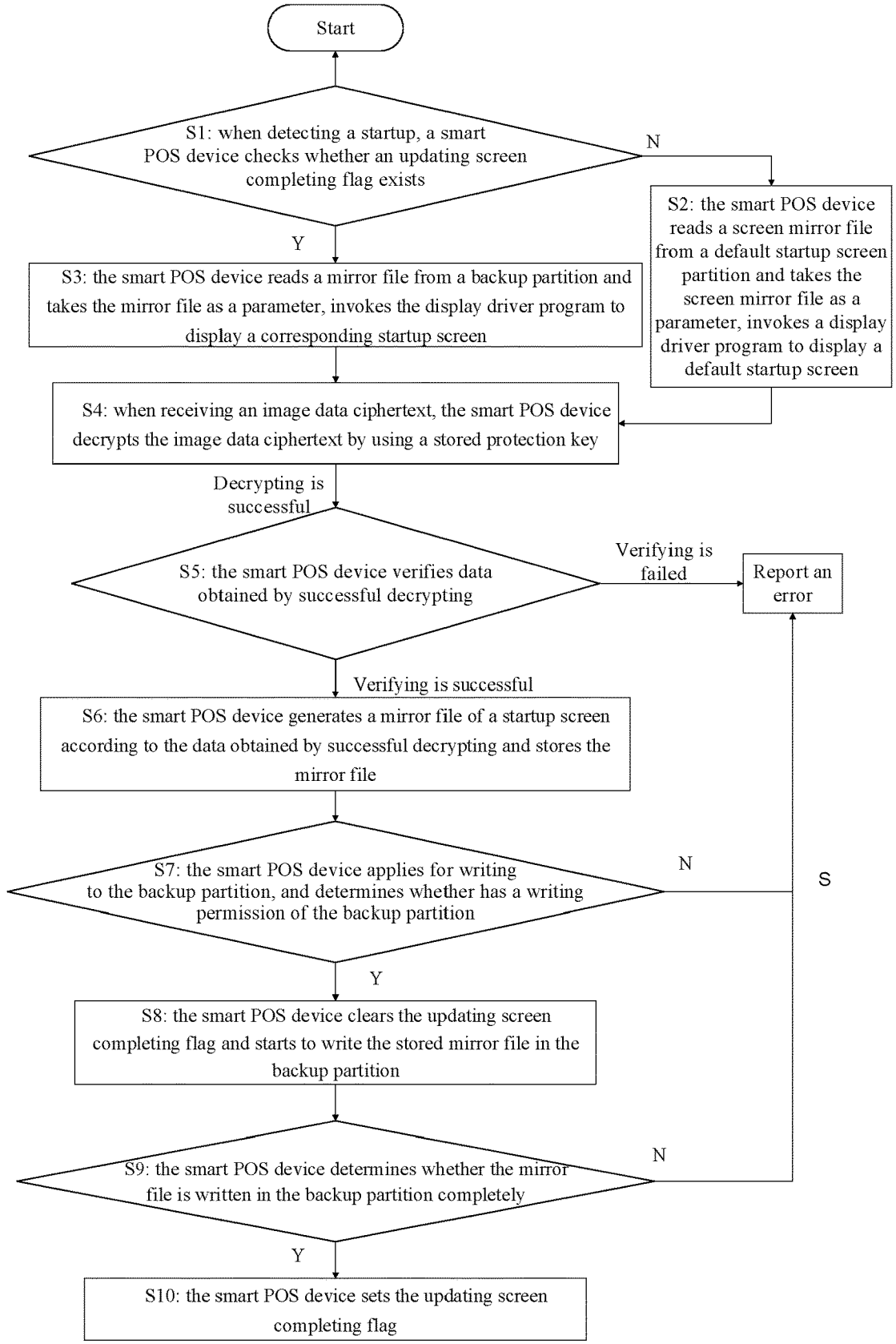
FIG. 1 is a flow chart of a method for implementing replacing a startup screen of a smart POS device provided by Embodiment 1 of the present disclosure.

Embodiment 1 of the present disclosure provides a method for implementing replacing a startup screen of a smart POS device. As shown by FIG. 1, the method includes:

StepS1: when detecting a startup, the smart POS device checks whether an updating screen completing flag exists, if yes, executes StepS3, otherwise, executes StepS2;

StepS2: the smart POS device reads a screen mirror file from a default startup screen partition and takes the screen mirror file as a parameter, invokes a display driver program to display a default startup screen, executes StepS4;

in an implementation, the startup screen in the present embodiment can be a picture, a video or an animation;

StepS3: the smart POS device reads a mirror file from a backup partition and takes the mirror file as a parameter, invokes the display driver program to display a corresponding startup screen, executes StepS4;

in an implementation, a mirror file format can be implemented differently. Corresponding to StepS3, there are many methods for implementing the mirror file format. The following gives illustration of two methods in detail.

Method 1: StepS3 in the present embodiment includes:

StepS3-1': the smart POS device reads a mirror file from a backup partition, acquires a signing result from the mirror file, verifies the mirror file by using the signing result, if verifying is successful, executes StepS3-2', if verifying is failed, reports an error, end;

StepS3-2': the smart POS device acquires mirror file header data structure from the mirror file, acquires screen description information from the acquired mirror file header data structure; acquires a compression result from the mirror file, decompresses the compression result by using a compression algorithm to obtain pixel data;

StepS3-3': the smart POS device takes the screen description information and the pixel data as parameters, invokes display the display driver program to display a corresponding startup screen, executes StepS4.

Method 2: StepS3 of the present embodiment includes:

StepS3-1: the smart POS device reads the mirror file from the backup partition, acquires a signing result from the mirror file, verifies the mirror file by using the signing result, if verifying is successful, executes StepS3-2, if verifying is failed, reports an error, end;

StepS3-2: the smart POS device acquires description structure from the mirror file, acquires screen information including total number of screens and description information of each screen from the description structure;

StepS3-3: the smart POS device reads data after the description structure from the mirror file, decompresses the read data by using a compression algorithm to obtain all pixel data, separates all pixel data into individual pixel data according to the total number of screens and description information of each screen in the screen information;

StepS3-4: according to a preset rule, the smart POS device acquires corresponding pixel data from the individual pixel data obtained by separating;

StepS3-5: the smart POS device takes the acquired pixel data and description information of a corresponding screen as parameters, invokes the display driver program to display the corresponding startup screen, executes StepS4;

StepS4: when receiving an image data ciphertext, the smart POS device decrypts the image data ciphertext by using a stored protection key, if decrypting is successful, executes StepS5;

StepS5: the smart POS device verifies data obtained by successful decrypting, if verifying is successful, executes StepS6, if verifying is failed, reports an error;

StepS6: the smart POS device generates a mirror file of the startup screen according to the data obtained by successful decrypting and stores the mirror file;

StepS7: the smart POS device applies for writing to the backup partition, and determines whether has a writing permission of the backup partition, if yes, executes StepS8; otherwise, reports an error;

StepS8: the smart POS device clears the updating screen completing flag and starts to write the stored mirror file in the backup partition;

StepS9: the smart POS device determines whether the mirror file is written in the backup partition completely, if yes, executes StepS10, otherwise, reports an error;

StepS10: the smart POS device sets the updating screen completing flag.

In the present embodiment, power off or forced shutdown may happen in the process of writing the mirror file into the backup partition, StepS8 further includes: the smart POS device sets a data start writing tag:

StepS10 further includes: the smart POS device clears the data start writing tag;

If no in StepS1, before executing StepS2, the method further includes:

StepP1: the smart POS device determines whether the data start writing tag exists, if yes, executes StepP2, otherwise, executes StepS2;

StepP2: the smart POS device applies for writing to the backup partition, determines whether has a writing permission of the backup partition, if yes, executes StepP3, otherwise, executes StepS2;

StepP3: the smart POS device starts to write the stored mirror file in the backup partition;

StepP4: the smart POS device determines whether the mirror file is written into the backup partition completely, if yes, executes StepP5, otherwise, executes StepS2;

StepP5: the smart POS device sets the updating screen completing flag, clears the data start writing tag, executes StepS3.

In the method of the present embodiment, in the process of writing the mirror file in the backup partition, even if power off or forced shutdown happens to the device, the mirror file can be written into the backup partition again upon startup next time, and a new startup screen, which can be a picture or other formats, i.e. video, animation, the like, will be displayed upon startup when the writing is successful.

In the present embodiment, a backup partition is set up; when the device starts on, a startup screen may be replaced according to the mirror file in the backup partition and no more firmware is required, which improves product competition because operating is safe, convenient and fast, a user can replace the startup screen at anytime, the usage is convenient; the data received by the smart POS device is data encrypted by the server, which make the process of replacing a startup screen safer and reliable.

Embodiment 2

Figure 2A:
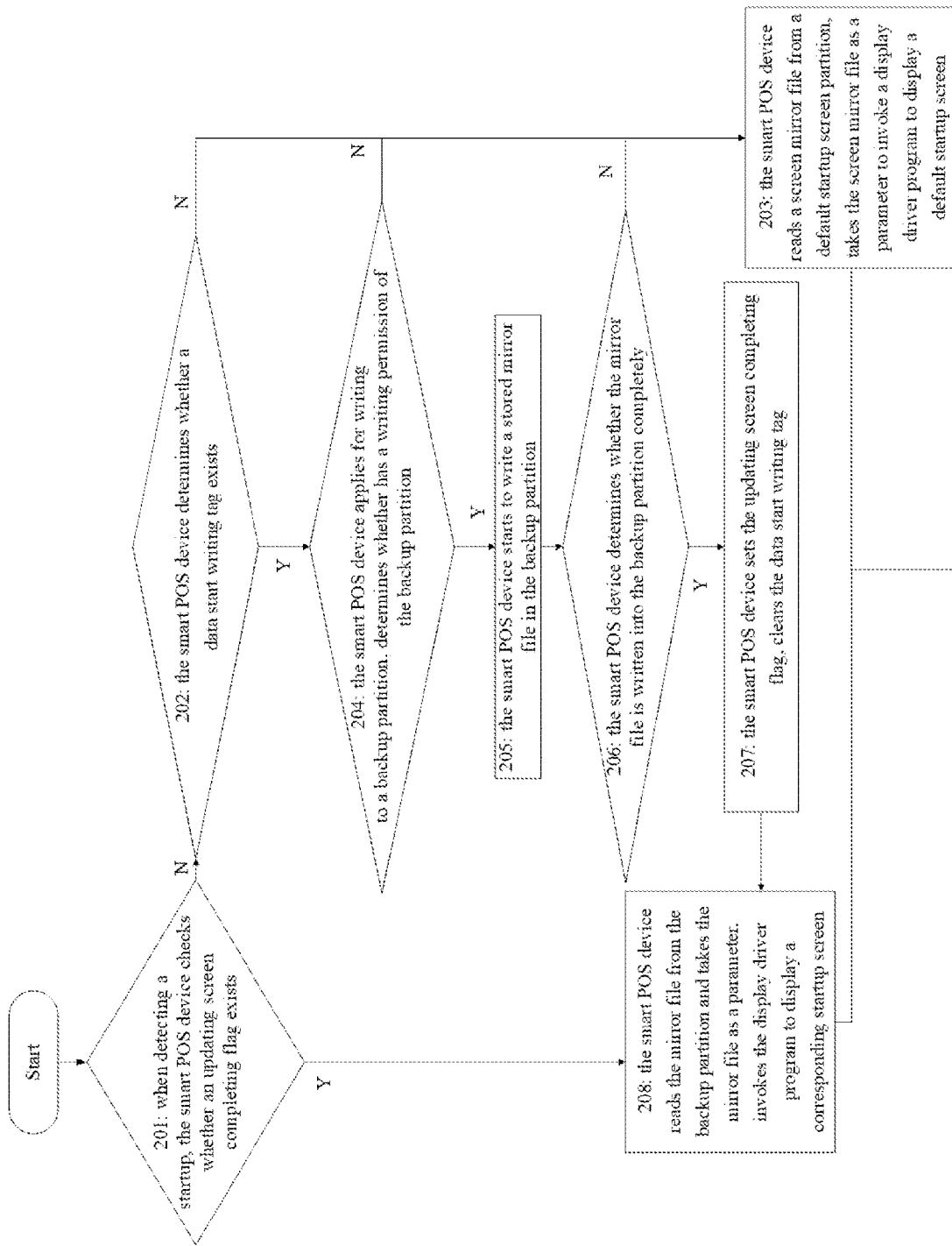
FIG. 2A and FIG. 2B are flow charts of a method for implementing replacing a startup screen of a smart POS device provided by Embodiment 2 of the present disclosure.
Figure 2B:
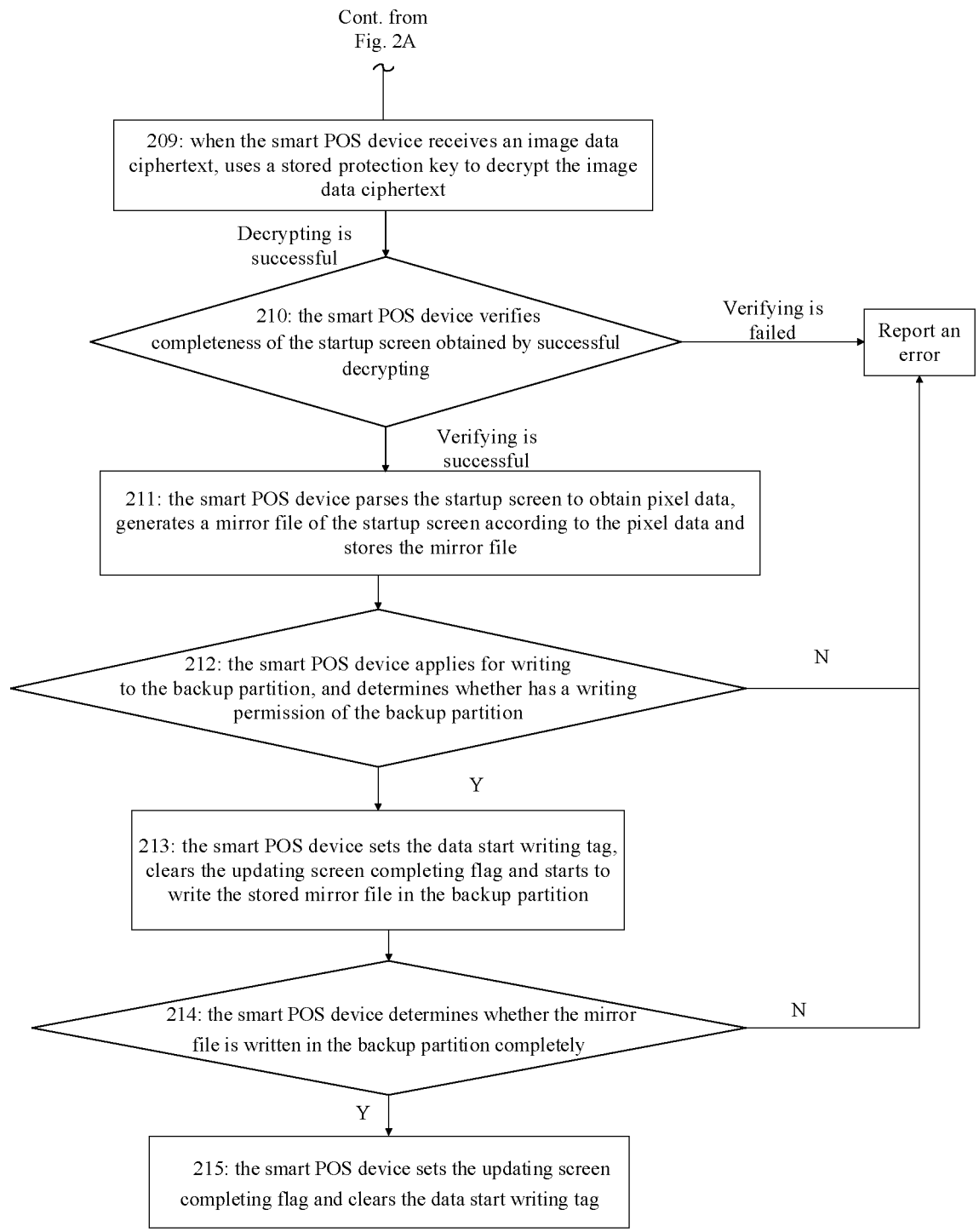

Embodiment 2 of the present disclosure provides an implementing method for replacing a startup screen of a smart POS device. In the present embodiment, what the smart POS device received is a startup screen. As shown by FIG. 2A and FIG. 2B, the method of the present embodiment includes:

Step201: when detecting a startup, the smart POS device checks whether an updating screen completing flag exists, if yes, executes Step208, otherwise, executes Step202;

Step202: the smart POS device determines whether a data start writing tag exists, if yes, executes Step204, otherwise, executes Step203;

Step203: the smart POS device reads a screen mirror file from a default startup screen partition, takes the screen mirror file as a parameter to invoke a display driver program to display a default startup screen, executes Step209;

Step204: the smart POS device applies for writing to a backup partition, determines whether has a writing permission of the backup partition, if yes, executes Step205, if no, executes Step203;

Step205: the smart POS device starts to write a stored mirror file in the backup partition;

if power off or forced shutdown happens on the smart POS device in the process of writing the mirror file of Step205 or Step214 in the last startup process so at to write parts of data in the backup partition, before writing the mirror file in the backup partition in Step205 after startup this time, the method further includes: the smart POS device deletes the data in the backup partition; or in Step205, the smart POS device updates the data in the backup partition with the mirror file, i.e. the mirror file is written in the backup partition by covering;

Step206: the smart POS device determines whether the mirror file is written into the backup partition completely, if yes, executes Step207, otherwise, executes Step203;

in an implementation, if determining result of Step206 is no, the method further includes: the smart POS device deletes the data in the backup partition;

Step207: the smart POS device sets the updating screen completing flag, clears the data start writing tag, executes Step208;

Step208: the smart POS device reads the mirror file from the backup partition and takes the mirror file as a parameter, invokes the display driver program to display a corresponding startup screen, executes Step209.

Specifically, in the present embodiment, Step208 includes:

Step208-1': the smart POS device reads the mirror file from the backup partition, acquires a signing result from the mirror file, verifies the mirror file by using the signing result, if verifying is successful, executes Step208-2', if verifying is failed, end;

specifically, in the present embodiment, Step208-1' includes: the smart POS device reads the mirror file form the backup partition, acquires 2048 bytes of data from the beginning position of the mirror file to obtain a signing result, decrypts the signing result with stored signing private key, performs hash computation on the data of the mirror file except the signing result to determine whether the decrypting result and the hash computation result are identical, if yes, verifying is successful, otherwise, verifying is failed;

Step208-2': mirror file header data structure is acquired from the mirror file, screen description information is acquired from the mirror file header data structure;

specifically, Step208-2' includes: starting from the 2049th byte of the mirror file, 512 bytes of data are read to obtain the logo_header structure, information, i.e. width and height of startup logo, etc., is acquired from the logo_header structure;

Step208-3': a compressed result is acquired from the mirror file, the compressed result is decompressed by using an RLE compression algorithm to obtain pixel data;

specifically, in the present embodiment, remaining data are acquired from the 2561st byte of the mirror file, the RLE compression algorithm is used to decompress the acquired data to obtain the pixel data;

Step208-4': the screen description information and the pixel data are taken as parameters, the display driver program is invoked to display a corresponding startup screen, executes Step209.

Correspondingly, a plurality of screens or files related to the screens are received, i.e. the mirror file is another kind of structure, then Step208 includes:

Step208-1: the smart POS device reads the mirror file from the backup partition, acquires a signing result from the mirror file, verifies the mirror file by using the signing result, if verifying is successful, executes Step208-2, if verifying is failed, reports an error, ends;

specifically, in the present embodiment, Step208-1 includes: the smart POS device reads the mirror file from the backup partition, acquires 2048 bytes of data from the start position of the mirror file to obtain a signing result, uses stored signing private key to decrypt the signing result, performs hash computation on the data of mirror file except the signing result, determines whether decrypted result is identical to the result of performing hash computation, if yes, verifying is successful, executes Step208-2, otherwise, verifying is failed, reports an error, end;

Step208-2: the smart POS device acquires a description structure from the mirror file, acquires total number of included screens and description information of each screen from the description structure;

for example, in the present embodiment, the smart POS device reads 512 bytes of data from the 2049th byte to obtain structure zip_header, and knows the number of the raw files from the structure zip_header, for example, in the present embodiment, there are 42 raw files, and size of each raw file can be acquired;

Step208-3: the smart POS device reads data after the description structure from the mirror file, decompresses the read data by using the RLE compression algorithm to obtain all pixel data, separates all pixel data into individual pixel data according to the total number of the screen and description information of each screen in the screen information;

for example, in the present embodiment, the smart POS device reads data from the end of the structure zip_header to the end of the mirror file from the mirror file, decompresses the read data by using the RLE compression algorithm, separates the read data into 42 small raw files according to size of each raw;

Step208-4: according to preset rule, the smart POS device acquires corresponding pixel data from the individual pixel data obtained by separating;

for example, in the present step, the smart POS device acquires the 8th raw file, i.e. the acquired screen pixel, from the 42 raw files according to a preset rule, for example, the preset rule is that the raw file of the screen pixel is the 8th raw file;

Step208-5: the smart POS device takes the acquired pixel data and description information of the corresponding screen as parameters, invokes the display driver program to display corresponding startup screen, executes Step209;

Step209: when the smart POS device receives an image data ciphertext, uses a stored protection key to decrypt the image data ciphertext, if decrypting is successful, executes Step210.

Specifically, in the present embodiment, before Step209, the method further includes:

StepT1, the smart POS device generates a protection key and stores the protection key, uses a transport layer security, i.e. TLS, certificate to verify an activating instruction when the smart POS device receives the activating instruction sent from a server, if verifying is successful, the smart POS device generates a successful activation response according to the protection key and the device information and sends the successful activation response to the server, the server parses the received successful activation response and stores the protection key and the device information obtained by parsing correspondingly; the device information includes device type;

in an implementation, before StepT1, the method further includes: the smart POS device generates a signing key pair and stores the signing key pair, sends a signing public key to the server, the server receives the signing public key and stores the signing public key;

in an implementation, generating and storing the protection key in the present embodiment can be performed after the activating instruction is verified successfully;

StepT2: when the server receives an updating triggering information of a user, the server sends a startup screen updating request to the smart POS device; the smart POS device receives the startup screen updating request and sends system information to the server; the server determines whether the stored startup screen matches the received system information, if they are matched, the server performs hash computation on the startup screen to obtain a startup screen hash value, encrypts the startup screen hash value and the startup screen by using the protection key corresponding to the system information to obtain an image data ciphertext and sends the image data ciphertext to the smart POS device, if they are not matched, reports an error;

in the present embodiment, the device information and the system information are in one-to-one correspondence; in this case, the system information includes: CPU manufacturer, device type and screen related information, for example, resolution;

specifically, the server determines whether the stored startup screen matches the received system information specifically is that the server determines whether the stored startup screen matches the screen display resolution in the received system information;

in an implementation, StepT2 can be replaced with that: when the server receives updating triggering information of a user, the server sends a startup screen updating request to the smart POS device, the smart POS device sends the system information to the server after receiving the startup screen updating request, the server converts the format of the startup screen to raw data format after receiving the system information to obtain screen data, obtains pixel data from the screen data, determines whether the pixel data matches the screen display resolution in the received system information, if the pixel data matches the screen display resolution, the server performs hash computation on the pixel data to obtain a pixel data hash value, uses the protection key corresponding to the system information to encrypt the pixel data hash value and the pixel data to obtain image data ciphertext, sends the image data ciphertext to the smart POS device; if the pixel data does not match the screen display resolution, the server adjusts pixels of the startup screen according to the screen display resolution in the system information and stores the adjusted startup screen, performs hash computation on the adjusted startup screen to obtain an adjusted startup screen hash value, uses the protection key corresponding to the system information to encrypt the adjusted startup screen hash value and the adjusted startup screen to obtain an image data ciphertext and sends the image data ciphertext to the smart POS device;

in an implementation, using the protection key corresponding to the system information to encrypt the startup screen hash value and the startup screen to obtain an image data ciphertext specifically is: searching for device information according to the system information, acquiring a corresponding protection key according to the device information, using the acquired protection key to encrypt the startup screen hash value and the startup screen with a 3DES encrypting algorithm to obtain the image data ciphertext;

in an implementation, if the server performs operation of replacing a startup screen on more than one smart POS devices at the same time, that is, the server processes more than one screens at the same time, then sends each screen to each corresponding smart POS device respectively, a specific process is: when the server receives updating triggering information of a user, the server sends an startup screen updating request to a smart POS device corresponding to the user; after the smart POS device receives the updating startup screen request, each smart POS device sends the system information to the server; the server determines whether a stored startup screen matches the system information received currently, if yes, the server performs hash computation on the startup screen to obtain a startup screen hash value, uses a stored protection key corresponding to the currently received system information to encrypt the startup screen hash value and the startup screen respectively to obtain image data ciphertext, sends the image data ciphertext respectively to the current smart POS device;

in an implementation, sending the image data ciphertext to the smart POS device specifically is: sending the image data ciphertext to the smart POS device by adopting USB/Internet via Terminal Management System (TMS).

Step210: the smart POS device verifies completeness of the startup screen obtained by successful decrypting, if verifying is successful, executes Step211, if verifying is failed, reports an error;

in the present embodiment, that the smart POS device verifies the completeness of the startup screen obtained by successful decrypting includes that the smart POS device performs hash computation on the startup screen obtained by successful decrypting, determines whether a result of performing hash computation is identical to the startup screen hash value obtained by successful decrypting, if yes, verifying is successful, otherwise, verifying is failed;

Step211: the smart POS device parses the startup screen to obtain pixel data, generates a mirror file of the startup screen according to the pixel data and stores the mirror file.

Figure 3:
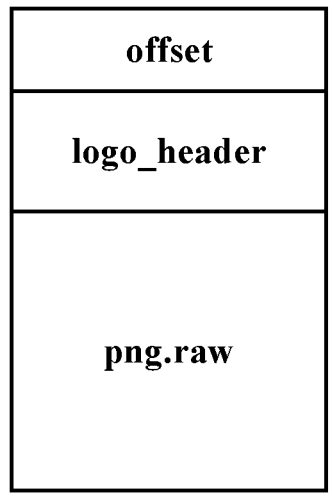
FIG. 3 is a diagram of a mirror file of Step 203 provided by Embodiment 2 of the present disclosure.

Specifically, in the present embodiment, Step211 includes:

Step211-0': the smart POS device converts format of the startup screen to raw (raw image file) data format to obtain screen data;

in an implementation, the format of the startup screen in the present embodiment includes PNG, JPEG, BMP;

Step211-1': the smart POS device parses the screen data to obtain a screen information header and screen information data; determines whether the startup screen meets a requirement according to the screen information header and the system information, if yes, executes Step211-2', otherwise, ends;

specifically, StepS11-1' of the present embodiment includes: the smart POS device parses the screen data to obtain screen information header, reads stored system information, determines whether the screen information header and the system information are matched, if yes, executes Step211-2', otherwise, end;

Step211-2': the smart POS device determines whether the screen information data is compressed, if yes, executes Step211-3', otherwise, executes Step211-4';

Step211-3': the smart POS device decompresses the screen information data according to a compression type in the screen information header, acquires pixel data from a decompressing result according to size of a raw pixel data file in the screen information header, executes Step211-5';

Step211-4': the smart POS device acquires pixel data from the screen information data according to size of a raw pixel data file in file header information, executes Step211-5';

Step211-5': the smart POS device creates a mirror file of the startup screen, sets a space with a preset size at the beginning position of the mirror file;

the mirror file of the present step in the present embodiment is an empty file, for example, the name of the file is splash.img, the preset size is 2k;

Step211-6': the smart POS device creates a mirror file header data structure and fills the mirror file header data structure with screen description information, writes the mirror file header data structure in a position after the space with the preset size in the mirror file;

specifically, Step211-6' includes: creating structure logo_header, using the screen description information to fill the structure logo_header, writing the structure logo_header in the position after the space with the preset size in the mirror file splash.img after filling is completed;

Step211-7': the smart POS device compresses the pixel data by using the RLE compression algorithm, writes a compressing result in a newly created compression file, writes the compression file in a position after the mirror file header data structure in the mirror file;

for example, the compression file name is png.raw, after performing Step211-7', the size of the mirror file splash.img equals to 2560 bytes plus size of png.raw;

Step211-8': the smart POS device sign the mirror file header data structure and the compressed file in the mirror file by using a stored signing public key, writes a signing result in the space with the preset size in the mirror file;

for example, use a signing public key to sign logo_header and png.raw in the current mirror file splash.img to obtain offset, write offset in a data area with 2k which is at the beginning of the file splash.img; the mirror file after performing Step211-8' is shown as FIG. 3.

Figure 4:
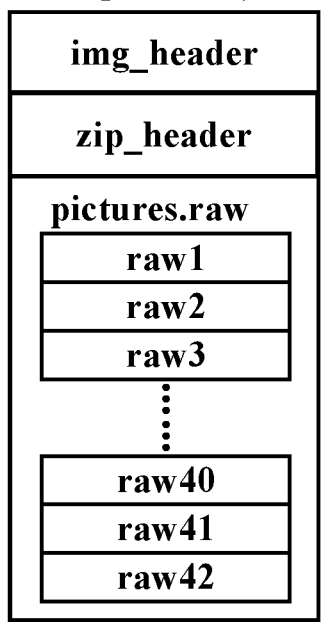
FIG. 4 is a diagram of a mirror file of another implementing process of Step 203 provided by Embodiment 2 of the present disclosure.

In the present embodiment, if there are more than one startup screens, i.e. there are more than one compressed files, the mirror file in Step211 is another kind of structure, correspondingly, Step211 includes:

Step211-0: the smart POS device converts the format of the startup screens to raw data format in turn to obtain screen data;

Step211-1: the smart POS device parses screen data to obtain screen information header and screen information data in turn, determines whether the startup screen meets a requirement according to the screen information header and the system information, if yes, executes Step211-2, otherwise, end;

specifically, Step211-2 of the present embodiment includes: the smart POS device parses the screen data in turn to obtain screen information header, reads the system information, determines whether the screen information header and the system information are matched, if yes, executes Step211-2, otherwise, end;

in this case, the system information includes: CPU manufacturer, screen related information, for example, resolution, and device type;

Step211-2: the smart POS device determines in turn whether the screen information data is compressed, if yes, executes Step211-3, otherwise, executes Step211-4;

Step211-3: the smart POS device decompresses the screen information data according to a compression type in the screen information header in turn, acquires pixel data from a decompressing result according to the size of the raw pixel data file in the screen information header, executes Step211-5;

Step211-4: the smart POS device acquires pixel data from the screen information data according to a size of a raw pixel data file in file header information and an acquiring rule in turn, executes Step211-5;

Step211-5: the smart POS device creates a mirror file of startup screen;

the mirror file in the present step of the present embodiment is an empty file, for example, the file name is splash.img;

Step211-6: the smart POS device creates a signature structure and writes the signature structure in a header of the mirror file;

for example, in Step211-6, structure img_header is created and written in header of the mirror file splash.img;

Step211-7: the smart POS device creates description structures, fills the description structures with screen information, writes the description structures in turn at a position after the signature structure in the mirror file;

for example, in Step211-7, a structure zip header is created, total number of screens and description information of each screen, for example, size of screen, are used to fill the structure zip_header, the structure zip_header after filling is written at the end of the splash.img file;

Step211-8: The smart POS device concatenates all pixel data according to a preset order, compresses a concatenating result by using the RLE compression algorithm, writes a compressing result in a newly created compression file;

for example, there are 42 screens in the present embodiment, pixel data are extracted from the 42 screens in turn to obtain 42 raw files, the 42 files are concatenated according to preset order, the RLE compression algorithm is used to compress a concatenating result to generate compression file pictures.raw;

Step211-9: the smart POS device writes the compression file at the position after the description structure in the mirror file;

Step211-10: the smart POS device uses the stored signing public key to sign the description structures and the compression file in the current mirror file, writes a signing result in the signature structure in the mirror file;

in the present embodiment, a schematic diagram of another kind of structure of the mirror file after Step211-10 is shown as FIG. 4.

Step212: the smart POS device applies for writing to the backup partition, and determines whether has a writing permission of the backup partition, if yes, executes Step213, otherwise reports an error;

Step213: the smart POS device sets the data start writing tag, clears the updating screen completing flag and starts to write the stored mirror file in the backup partition;

in an implementation, if the backup partition has data, in Step213, the mirror file is written in the backup partition by covering the existed data in the backup partition, or the data in the backup partition is cleared before writing the mirror file; i.e. the smart POS device sets the data start writing tag, clears the updating screen completing flag and starts to update the data of the backup partition with the mirror file; or the smart POS device sets the data start writing tag, clears the updating screen completing flag, deletes data in the backup partition and starts to write the mirror file in the backup partition;

in an implementation, in Step213, in the process of writing the mirror file in the backup partition, power-off or forced shut up may happen to the smart POS device;

Step4: the smart POS device determines whether the mirror file is written in the backup partition completely, if yes, executes Step215, otherwise, reports an error;

in an implementation, if in Step213, the data is written directly, when the smart POS device determines that the mirror file is not written in the backup partition completely in Step214, the method further includes: the smart POS device deletes the data in the backup partition, i.e. when the smart POS device determines that the mirror file is not written in the backup partition completely, the smart POS device deletes the data in the backup partition, or the smart POS device deletes the data in the backup partition before writing the data upon startup next time; if in Step213, the data is written by covering the data in the backup partition, in Step214, when the smart POS device determines that the mirror file is not written in the backup partition completely, the smart POS device reports an error;

Step215: the smart POS device sets the updating screen completing flag and clears the data start writing tag.

In the present embodiment, when the server determines that the stored startup screen and the screen display resolution in the received system information are not matched, adjusting pixel of the startup screen according to the screen display resolution in the system information can be implemented by the smart POS device; that is, in Step211, the smart POS device parses the startup screen to obtain pixel data, determines whether the startup screen obtained by decrypting matches the system information of device according to the pixel data, if yes, generates and saves a mirror file of the startup screen according to the pixel data; if the startup screen and the screen display resolution in the system information are not matched, the smart POS device adjusts the pixel of the pixel data according to the screen display resolution in the system information, generates a mirror file according to the adjusted pixel data.

In the present embodiment, at the time of the smart POS device powering on, if the smart POS device determines that the updating screen completing flag exists, i.e. the smart POS device detects that backup partition has a completed mirror file, the smart POS device displays a corresponding screen according to the mirror file in the backup partition; if the smart POS device determines that the updating screen completing flag and the data start writing tag do not exist, i.e. the smart POS device detects that backup partition has no mirror file, the smart POS device displays a default screen according to a mirror file in the default startup screen partition, if the smart POS device determines that no updating screen completing flag exists but the data start writing tag exists, i.e. the smart POS device determines that an uncompleted mirror file exists in the backup partition, the smart POS device rewrites the stored mirror file in the backup partition and displays a corresponding screen according to the mirror file in the backup partition after writing the stored mirror file successfully. In the present embodiment, the image data ciphertext received by the smart POS device is obtained by performing hash computation on the startup screen and the startup screen hash value by the server, the startup screen is transferred after encrypting operation, so as to make the process of replacing a startup screen to be safer and reliable, a mirror file is generated according to a completed startup screen and stored, the stored mirror file is written into the backup partition in such way that the smart POS device can use the mirror file for powering on next time; even if exception happens in the process of writing the mirror file in the backup partition which leads to writing failure, the stored mirror file can be rewritten in the backup partition when the smart POS device powers up next time. In the present embodiment, a backup partition is set; when the smart POS device powers up, the smart POS device can replace the startup screen independently according to the mirror file in the backup partition and no updating firmware is required, this operating is safe, convenient and fast and product competitiveness is improved. In addition, a user can replace startup screen at any time, which is convenient to use. In the method of the present embodiment, even if power off or forced shut up happens in the process of writing the mirror file in the backup partition, the mirror file can be rewritten when the smart POS device powers up next time, and displays a new startup screen, which may be a picture, or a video or animation, or other forms, when the mirror file is written successfully.

Embodiment 3

Figure 5A:
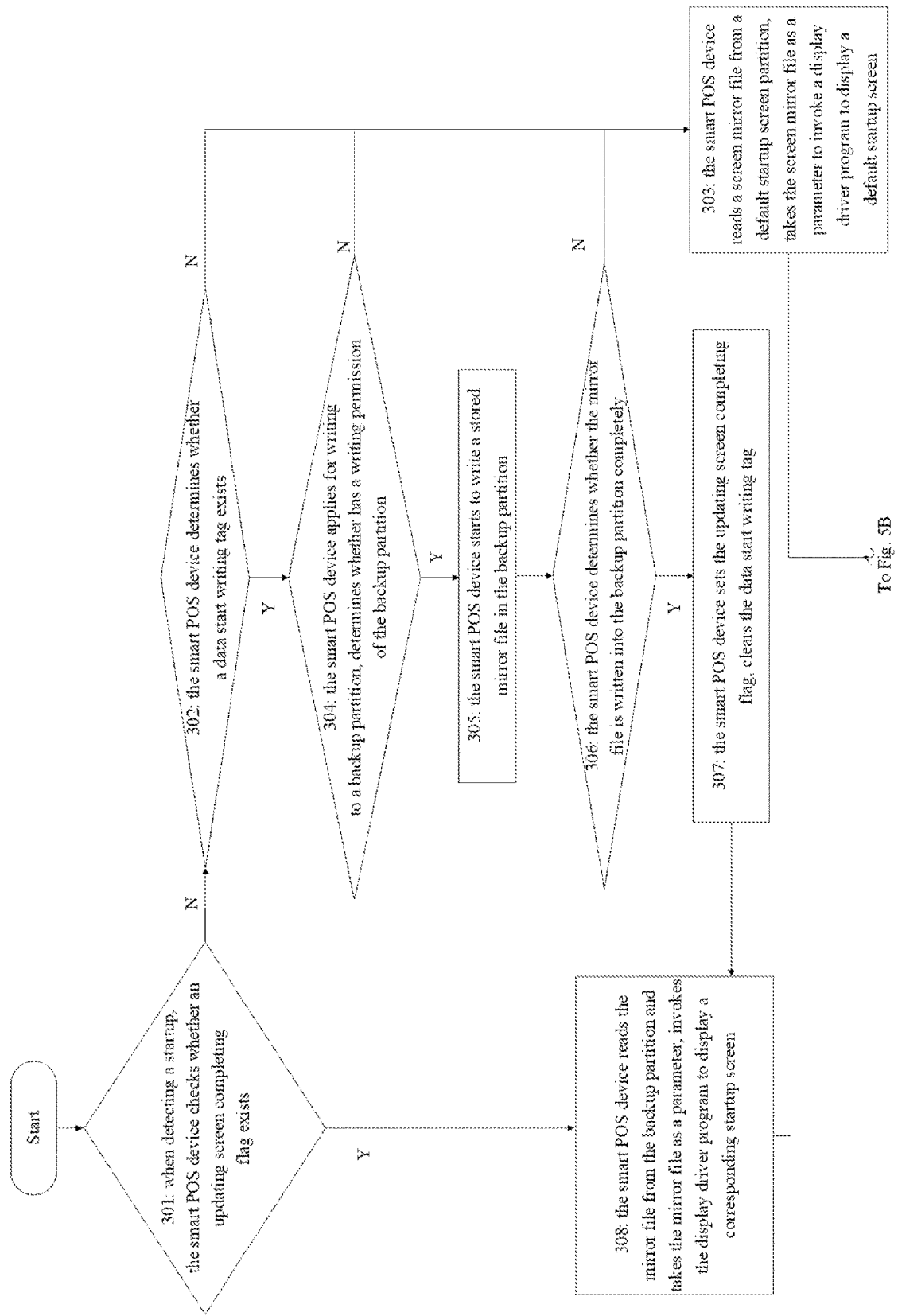
FIG. 5A and FIG. 5B are flow charts of a method for implementing replacing a startup screen of a smart POS device provided by Embodiment 3 of the present disclosure.
Figure 5B:
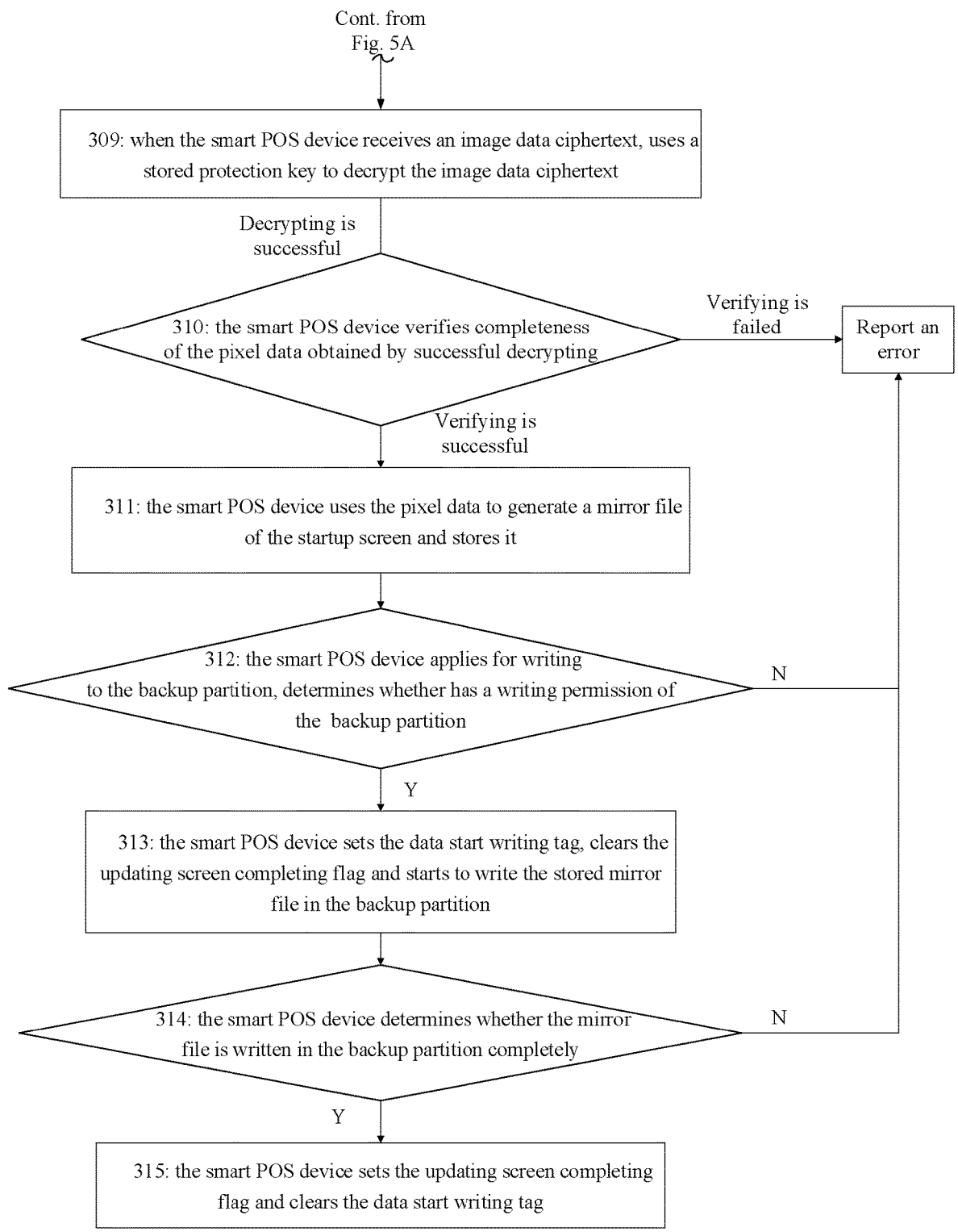

Embodiment 3 of the present disclosure provides an implementing method for replacing a startup screen of a smart POS device. In the present embodiment, what the smart POS device received is pixel data. As shown by FIG. 5A and FIG. 5B, the method of the present embodiment includes:

Step301: when detecting a startup, the smart POS device checks whether an updating screen completing flag exists, if yes, executes Step308, otherwise, executes Step302;

Step302: the smart POS device determines whether a data start writing tag exists, if yes, executes Step304, otherwise, executes Step303;

Step303: the smart POS device reads a screen mirror file from a default startup screen partition, takes the screen mirror file as a parameter to invoke a display driver program to display a default startup screen, executes Step309;

Step304: the smart POS device applies for writing to a backup partition, determines whether has a writing permission of the backup partition, if yes, executes Step305, if no, executes Step303;

Step305: the smart POS device starts to write a stored mirror file in the backup partition;

if power off or forced shutdown happens on the smart POS device in the process of writing the mirror file of Step305 or Step314 in the last startup process so as to write parts of data in the backup partition, in Step305 after startup this time and before writing the mirror file in the backup partition, the method further includes: the smart POS device deletes the data in the backup partition; or in Step305 the smart POS device updates the data in the backup partition with the mirror file, i.e. the mirror file is written in the backup partition by covering;

Step306: the smart POS device determines whether the mirror file is written into the backup partition completely, if yes, executes Step307, otherwise, executes Step303;

in an implementation, if determining result of Step306 is no, the method further includes: the smart POS device deletes the data in the backup partition;

Step307: the smart POS device sets the updating screen completing flag, clears the data start writing tag, executes Step308;

Step308: the smart POS device reads the mirror file from the backup partition and takes the mirror file as a parameter, invokes the display driver program to display a corresponding startup screen, executes Step309;

in the present embodiment, the process of implementing Step308 is identical to that of Step208 in Embodiment 2, no more detail is given here;

Step309: when the smart POS device receives an image data ciphertext, uses a stored protection key to decrypt the image data ciphertext, if decrypting is successful, executes Step310.

Specifically, in the present embodiment, before Step309, the method further includes:

StepF1: the smart POS device generates a protection key and stores the protection key, verifies an activating instruction by using a TLS certificate when receiving the activating instruction sent from the server, if verifying is successful, the smart POS device generates a successful activation response according to the protection key and the device information and sends the successful activation response to the server, the server parses the received successful activation response and correspondingly stores the protection key and the device information obtained by parsing; the device information includes a device type;

in an implementation, before StepF1, the method further includes: the smart POS device generates a signing key pair and stores the signing key pair, sends a signing public key to the server; the server receives the signing public key and stores the signing public key;

in an implementation, generating and storing the protection key in the present embodiment can be performed after the activating instruction is verified successfully;

StepF2: when the server receives an updating triggering information of a user, the server sends a startup screen updating request to the smart POS device; the smart POS device receives the startup screen updating request and sends system information to the server; the server converts a format of the startup screen to a raw data format to obtain screen data after receiving the system information, acquires pixel data from the screen data, determines whether the stored startup screen matches the received system information according to the pixel data, if they are matched, the server performs hash computation on the pixel data to obtain a pixel data hash value, encrypts the pixel data hash value and the pixel data by using the stored protection key corresponding to the received system information to obtain an image data ciphertext and sends the image data ciphertext to the smart POS device, if they are not matched, reports an error;

in the present embodiment, the device information and the system information are in one-to-one correspondence; in this case, the system information includes: CPU manufacturer, device type and screen related information, for example, screen display resolution;

in an implementation, encrypting the pixel data hash value and the pixel data by using the stored protection key corresponding to the received system information to obtain image data ciphertext specifically includes: searching for device information according to the system information, acquiring a corresponding protection key according to the device information, encrypting the pixel data hash value and the pixel data by using the acquired protection key via 3DES encryption algorithm to obtain image data ciphertext;

specifically, the server determining whether the stored startup screen matches the received system information is that: the server determines whether the stored startup screen matches the screen display resolution in the received system information;

in an implementation, StepF2 can be replaced with that: when the server receives updating triggering information of a user, the server sends a startup screen updating request to the smart POS device, the smart POS device sends the system information to the server after receiving the startup screen updating request, the server converts the format of the startup screen to a raw data format after receiving the system information to obtain screen data, obtains pixel data from the screen data, determines whether the pixel data matches the screen display resolution in the received system information, if the pixel data matches the screen display resolution, the server performs hash computation on the pixel data to obtain a pixel data hash value, uses the protection key corresponding to the system information to encrypt the pixel data hash value and the pixel data to obtain image data ciphertext, sends the image data ciphertext to the smart POS device; if the pixel data does not match the screen display resolution, the server adjusts pixels in pixel data of the startup screen according to the screen display resolution in the system information, performs hash computation on the adjusted pixel data to obtain an adjusted pixel data hash value, uses the protection key corresponding to the system information to encrypt the adjusted pixel data hash value and the adjusted pixel data to obtain image data ciphertext and sends the image data ciphertext to the smart POS device;

in an implementation, if the server performs operation of replacing a startup screen on more than one smart POS devices at the same time, that is, the server processes more than one screens at the same time, then sends each screen to each corresponding smart POS device respectively, a specific process is: when the server receives updating triggering information of a user, the server sends an startup screen updating request to a smart POS device corresponding to the user; after the smart POS device receives the updating startup screen request, each smart POS device sends the system information to the server; the server determines whether a stored startup screen matches the system information received currently, if yes, the server converts the format of startup screen to raw data format to obtain screen data, acquires pixel data from the screen data, performs hash computation on the pixel data to obtain a pixel data hash value, uses a stored protection key corresponding to the currently received system information to encrypt the pixel data hash value and the pixel data to obtain image data ciphertext, sends the image data ciphertext to the current smart POS device;

in an implementation, the startup screen of the present embodiment can be in format of PNG, JPEG, BMP;

Specifically, in the present embodiment, acquiring pixel data from the screen data includes:

StepH1: the server parses the screen data to obtain screen information header and screen information data, determines whether the pixel data meets a requirement according to the screen information header and the system information, if yes, executes StepH2, otherwise, end;

specifically, StepH1 of the present embodiment includes: the server parses the screen data to obtain screen information header, reads system information, determines whether the screen information header matches the system information, if yes, executes StepH2, otherwise, end;

in this case, the system information includes: CPU manufacturer, screen related information, for example, resolution, and device type;

StepH2: the server determines whether the screen information data is compressed, if yes, executes StepH3, otherwise, executes StepH4;

StepH3: the server decompresses the screen information data according to the compression type in the screen information header, acquires pixel data from a compressing result according to the size of the raw pixel data file in the screen information header;

StepH4: the server acquires pixel data from the screen information according to the size of raw pixel data file in the file header information.

In an implementation, there are more than one startup screens in the present embodiment, there are another way for implementing converting the startup screen formation to raw data format to obtain screen data, acquiring pixel data from the screen data, which includes following steps:

StepK1: the server converts the format of each startup screen to raw data format to obtain screen data in turn, takes the first screen data as current screen data;

StepK2: the server parses the current screen data to obtain a corresponding screen information header and screen information data, determines whether the current startup screen meets a requirement according to the screen information header and the system information, if yes, executes StepK3, otherwise, end;

StepK3: the server determines whether the screen information data is compressed, if yes, executes StepK4, otherwise, executes StepK5;

StepK4: the server decompresses the screen information data according to a compression type in the screen information header, acquires pixel data of current screen from a decompressing result according to the size of raw pixel data file in the screen information header, executes StepK6;

StepK5: the server acquires pixel data of the current screen from the screen information data in turn according to the size of the raw pixel data file in the file header information and a preset acquiring rule, executes StepK6;

StepK6: the server determines whether the screen data is processed completely, if yes, keep on processing, otherwise, takes next screen data as current screen data, go back to StepK2;

in an implementation, sending the encrypted screen data to the smart POS device specifically is: sending the encrypted screen data to the Smart POS device by adopting USB/Internet via TMS.

Step310: the smart POS device verifies completeness of the pixel data obtained by successful decrypting, if verifying is successful, executes Step311, if verifying is failed, reports an error;

in the present embodiment, the smart POS device verifying the completeness of the pixel data obtained by successful decrypting includes that the smart POS device performs hash computation on the pixel data obtained by successful decrypting, determines whether a result of performing hash computation is identical to the pixel data hash value obtained by successful decrypting, if yes, verifying is successful, otherwise, verifying is failed;

Step311: the smart POS device uses the pixel data to generate a mirror file of the startup screen and stores it;

in the present embodiment, the mirror file includes: mirror file header offset address, mirror file header and screen pixel data.

Specifically, Step311 of the present embodiment includes:

Step311-1': the smart POS device creates a mirror file of startup screen, sets a space with a preset size at the beginning position of the mirror file;

the mirror file of the present step in the present embodiment is an empty file, for example, the name of the file is splash.img, the preset size is 2 k;

Step311-2': the smart POS device fills the mirror file header data structure with screen description information, writes the mirror file header data structure in a position after the space with the preset size in the mirror file;

specifically, Step 311-2' includes: the smart POS device fills the structure logo_header according to the screen description information, writes the structure logo_header in the position after the space with the preset size in the mirror file splash.img after filling is completed;

for example, the screen description information includes: width information and height information of startup logo, for example, width=720, height=1280, the size of the mirror file splash.img after Step 311-2' is size of the structure plus 2 k, i.e. 512+2048=2560 bytes;

Step311-3': the smart POS device compresses the pixel data by using an RLE compression algorithm, writes a compressing result in a newly created compression file, writes the compression file in the position after the mirror file header data structure in the mirror file;

for example, the compression file name is png.raw, after performing Step311-3', the size of the mirror file splash.img equals to 2560 bytes plus size of png.raw;

Step311-4': the smart POS device uses a stored signing public key to sign the mirror file header data structure and the compressed file in the mirror file, writes a signing result in the space with the preset size in the mirror file and stores the finally obtained mirror file;

for example, the signing public key is used to sign logo_header structure and png.raw in the current mirror file splash.img, and a signing result is written in a data area with 2 k which is at the beginning of the file splash.img.

In an implementation, another way for implementing Step311 of the present embodiment is:

Step311-1: the smart POS device creates a mirror file of startup screen;

Step311-2: the smart POS device creates a signature structure and writes the signature structure in the header of the mirror file;

Step311-3: the smart POS device creates description structures, acquires total number of screens and description information of each screen from the decrypting result, fills the description structures with screen information which includes total number of screen and description information of each screen, writes the description structures in turn at a position after the signature structure in the mirror file;

Step311-4: according to a preset order, the smart POS device concatenates all pixel data obtained by decrypting, compresses a concatenating result by using a compression algorithm and writes a compressing result in a newly created compression file;

Step311-5: the smart POS device writes the compression file at a position after the description structure in the mirror file in turn;

Step311-6: the smart POS device signs the description structure and the compression file in the current mirror file by using the stored signing public key, writes a signing result in the signature structure in the mirror file, stores the mirror file obtained finally.

Step312: the smart POS device applies for writing to the backup partition, determines whether has a writing permission of the backup partition, if yes, executes Step313, otherwise reports an error;

Step313: the smart POS device sets the data start writing tag, clears the updating screen completing flag and starts to write the stored mirror file in the backup partition;

in an implementation, if the backup partition has data, in Step313, the mirror file is written by covering, or the data in the backup partition is cleared before writing the mirror file in the backup partition; i.e. the smart POS device sets the data start writing tag, clears the updating screen completing flag and starts to update the data in the backup partition with the mirror file; or the smart POS device sets the data start writing tag, clears the updating screen completing flag, deletes data in the backup partition and starts to write the mirror file in the backup partition;

in an implementation, in Step313, in the process of writing the mirror file in the backup partition, power-off or forced shut up may happen to the smart POS device;

Step314: the smart POS device determines whether the mirror file is written in the backup partition completely, if yes, executes Step315, otherwise, reports an error;

in an implementation, if in Step313, the data is written directly, when the smart POS device determines that the mirror file is not written in the backup partition completely in Step314, the method further includes: the smart POS device deletes the data in the backup partition, i.e. when the smart POS device determines that the mirror file is not written in the backup partition completely, the smart POS device deletes the data in the backup partition, or the smart POS device deletes the data in the backup partition before the device writes data upon startup next time; if in Step313, the data is written by covering, and in Step314, when the smart POS device determines that the mirror file is not written in the backup partition completely, the smart POS device reports an error;

Step315: the smart POS device sets the updating screen completing flag and clears the data start writing tag.

In the present embodiment, when the server determines that the stored startup screen and the screen display resolution in the received system information are not matched, adjusting pixel of the startup screen according to the screen display resolution in the system information can be implemented by the smart POS device; that is, in Step311, the smart POS device determines whether the startup screen matches the system information of the device according to pixel data obtained by decrypting successfully, if yes, a mirror file of the startup screen according to the pixel data is generated and saved; if the pixel data and the screen display resolution in the system information are not matched, the smart POS device adjusts the pixel of the pixel data according to the screen display resolution in the system information, generates a mirror file according to the adjusted pixel data.

In the method of the present embodiment, if the smart POS device determines that the updating screen completing flag exists upon startup, i.e. the smart POS device detects 3 that backup partition has a completed mirror file, the smart POS device displays a corresponding screen according to the mirror file in the backup partition; if the smart POS device determines that the updating screen completing flag and the data start writing tag do not exist, i.e. the smart POS device detects that backup partition has no mirror file, the smart POS device displays a default screen according to a mirror file in the default startup screen partition, if the smart POS device determines that no updating screen completing flag exists but the data start writing tag exists, i.e. the smart POS device determines that an uncompleted mirror file exists in the backup partition, the smart POS device rewrites the stored mirror file in the backup partition and displays a corresponding screen according to the mirror file in the backup partition after writing the stored mirror file successfully. In the present embodiment, the image data ciphertext received by the smart POS device is obtained by that the server encrypts the pixel data and the pixel data hash value obtained by processing the startup screen, the pixel data is transferred after going through encryption operation, which makes the process of replacing a startup screen to be safer and reliable, the smart POS device generates a mirror file according to completed pixel data and stores it, then writes the mirror file into the backup partition, in such way that the smart POS device can use the mirror file upon startup next time; even if exception happens in the process of writing the mirror file in the backup partition which leads to failure, the stored mirror file can be rewritten in the backup partition when the smart POS device powers up next time. In the present embodiment, the backup partition is set; when the smart POS device powers up, the smart POS device can replace the startup screen independently according to the mirror file in the backup partition and no updating firmware is required, such operating is safe, convenient and fast and product competitiveness is improved. In addition, a user can replace startup screen at any time, which is convenient to use. In the method of the present embodiment, even if power off or forced shut up happens in the process of writing the mirror file in the backup partition, the mirror file can be rewritten when the smart POS device powers up next time and a new startup screen displays upon startup, which may be a picture, or a video, an animation, and the like, when the mirror file is written successfully.

Embodiment 4

Figure 6A:
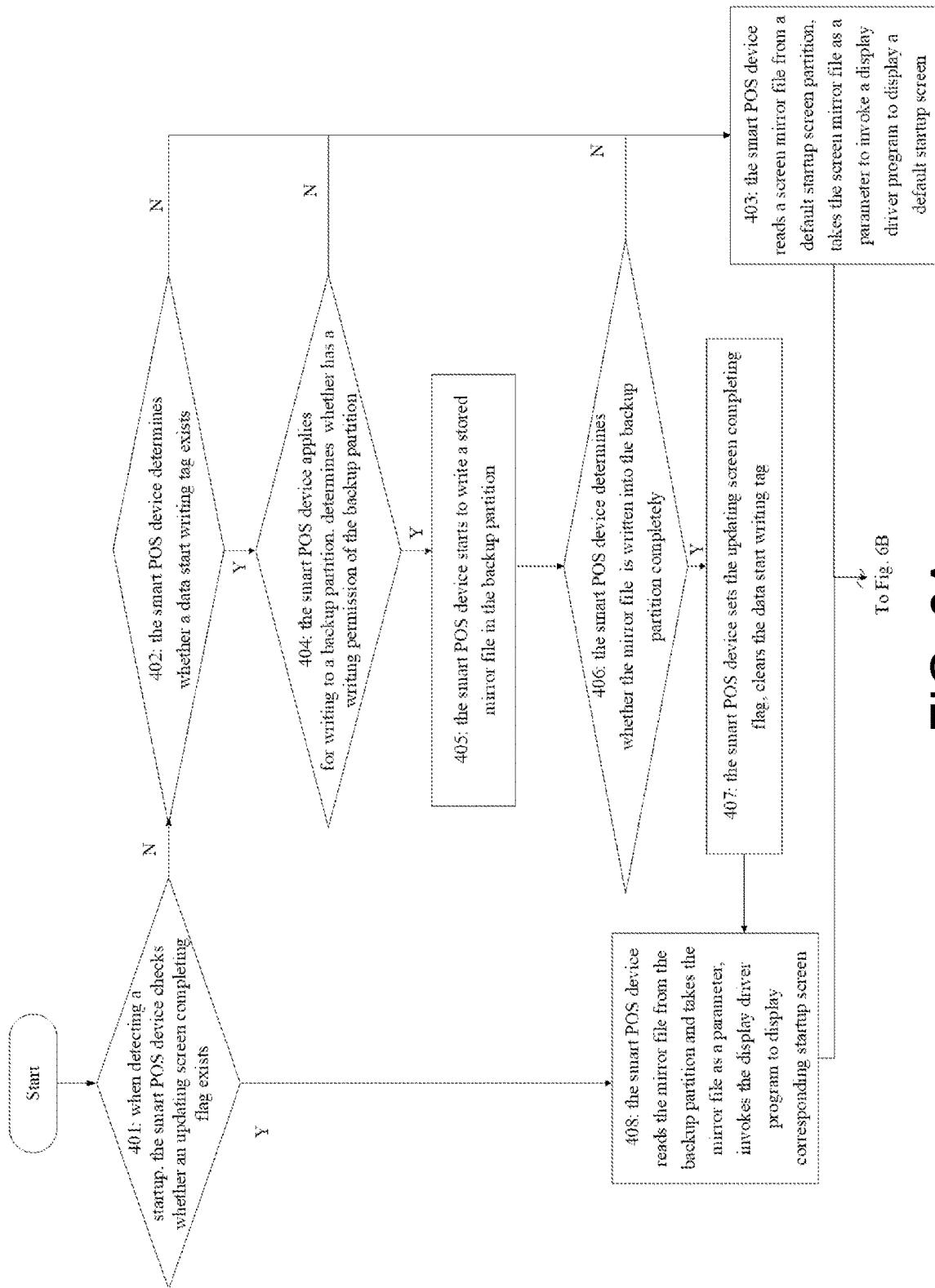
FIG. 6A and FIG. 6B are flow charts of a method for implementing replacing a startup screen of a smart POS device provided by Embodiment 4 of the present disclosure.
Figure 6B:
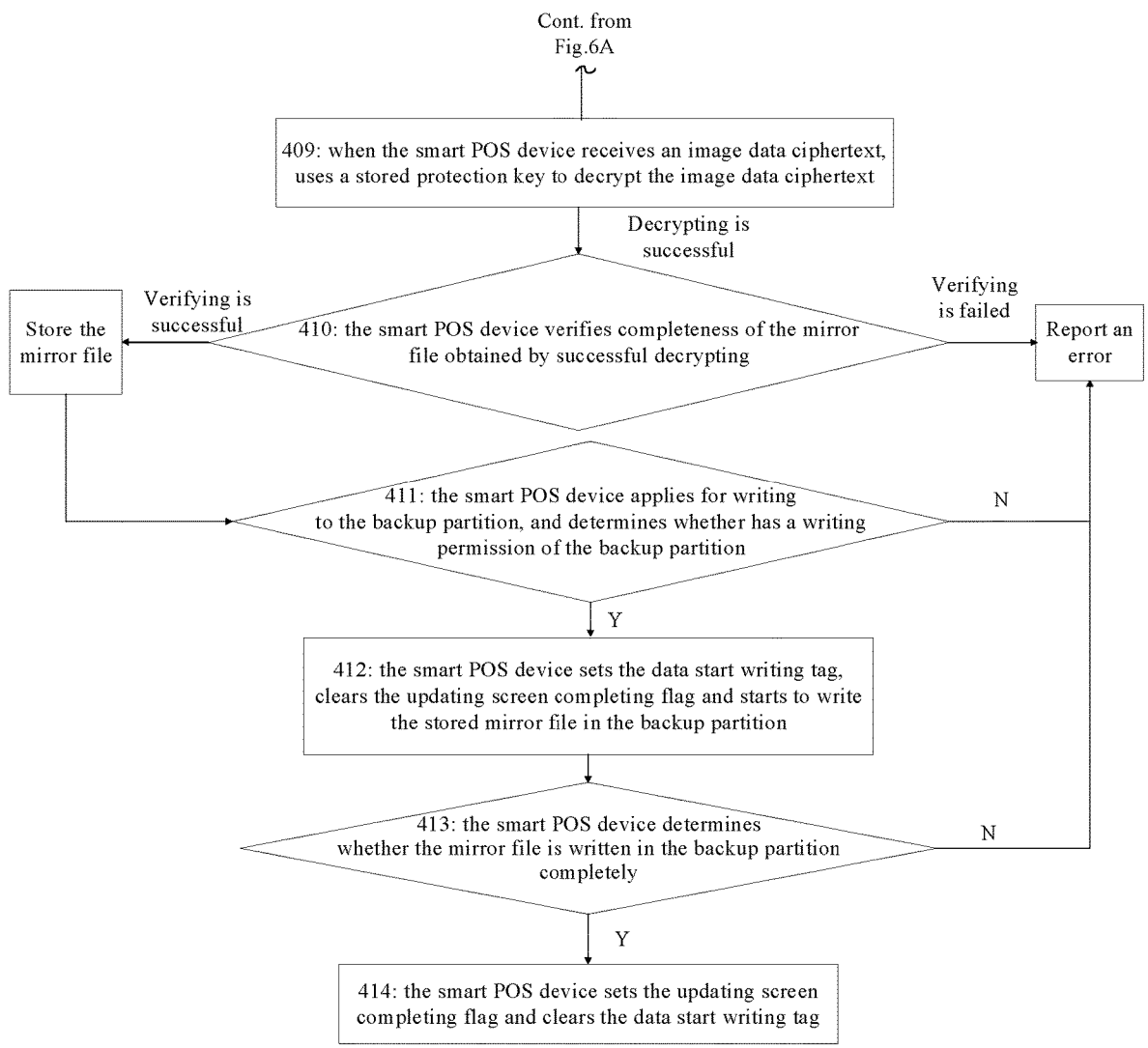
Figure 7A:
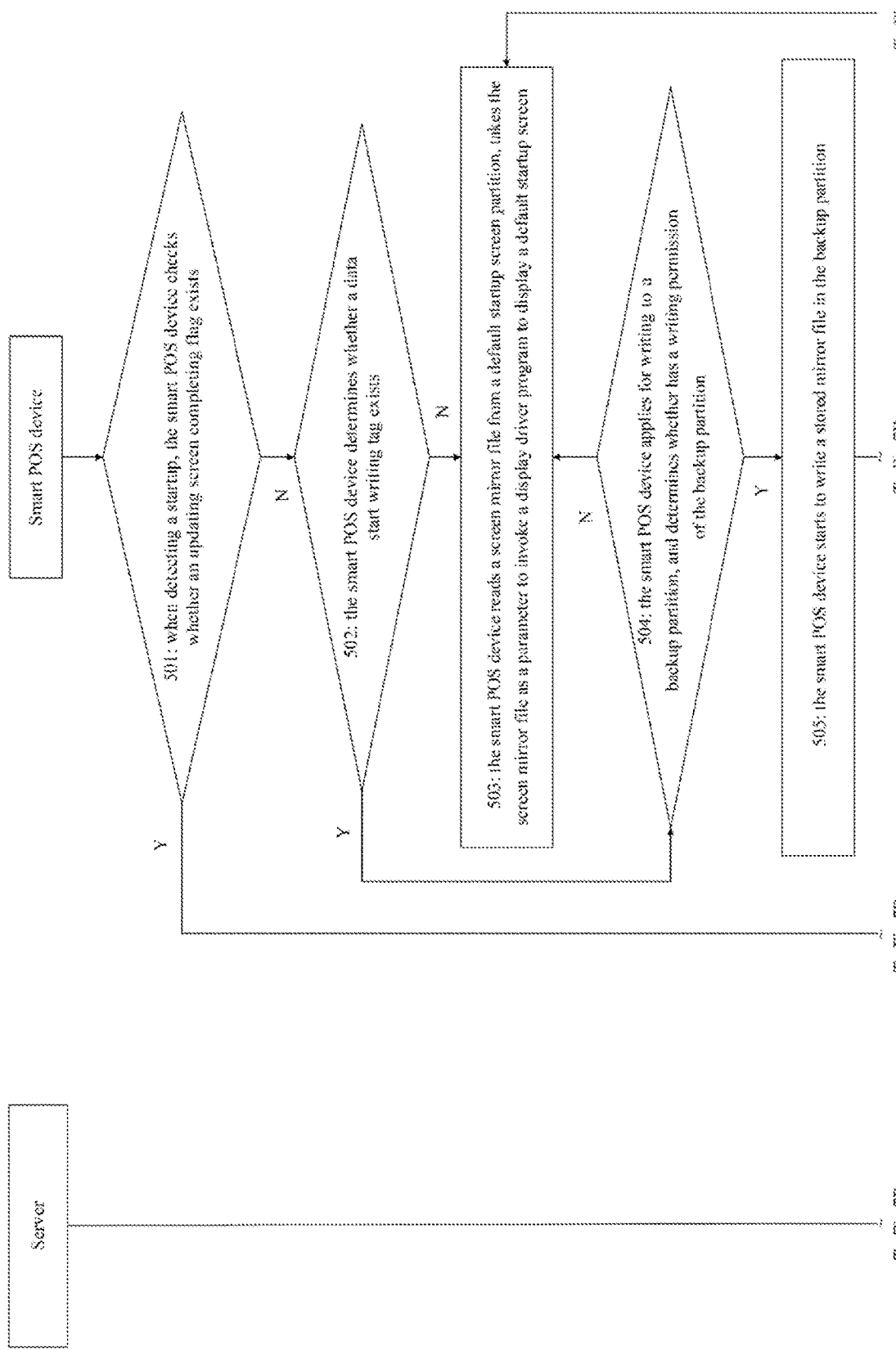
FIG. 7A, FIG. 7B, FIG. 8A and FIG. 8B are flow charts of a method for implementing replacing a startup screen of a smart POS device provided by Embodiment 5 of the present disclosure.
Figure 7B:
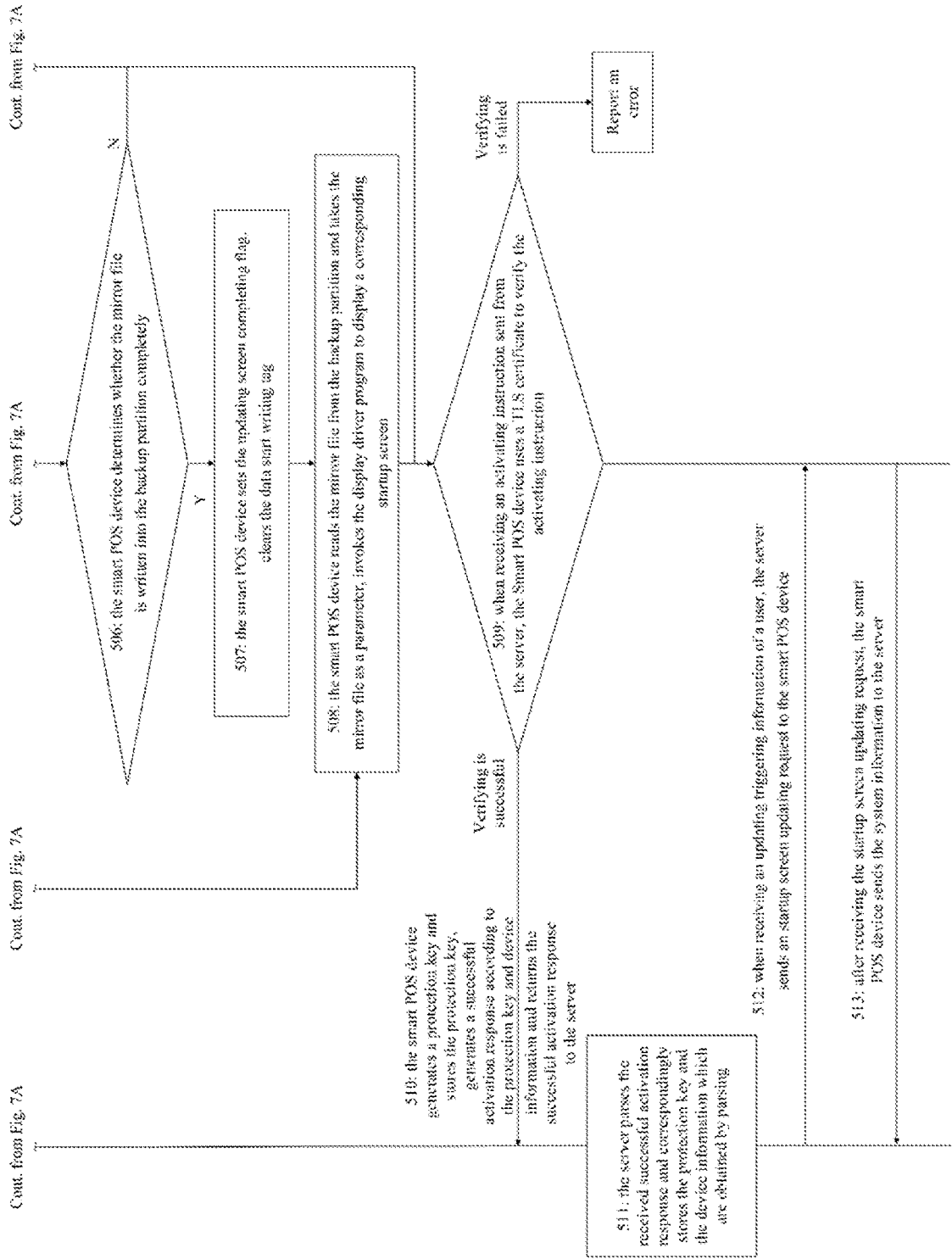
Figure 8A:
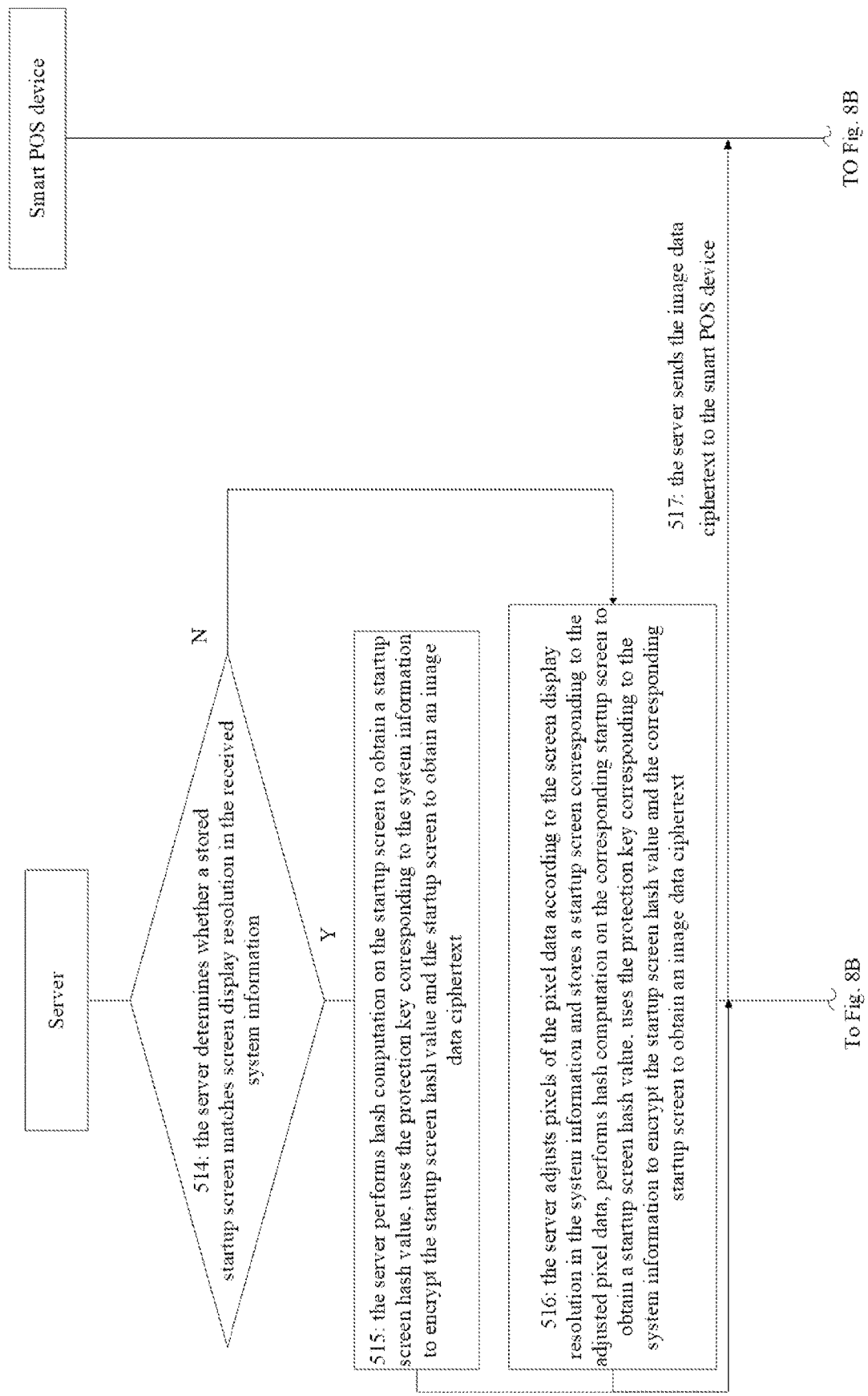
Figure 8B:
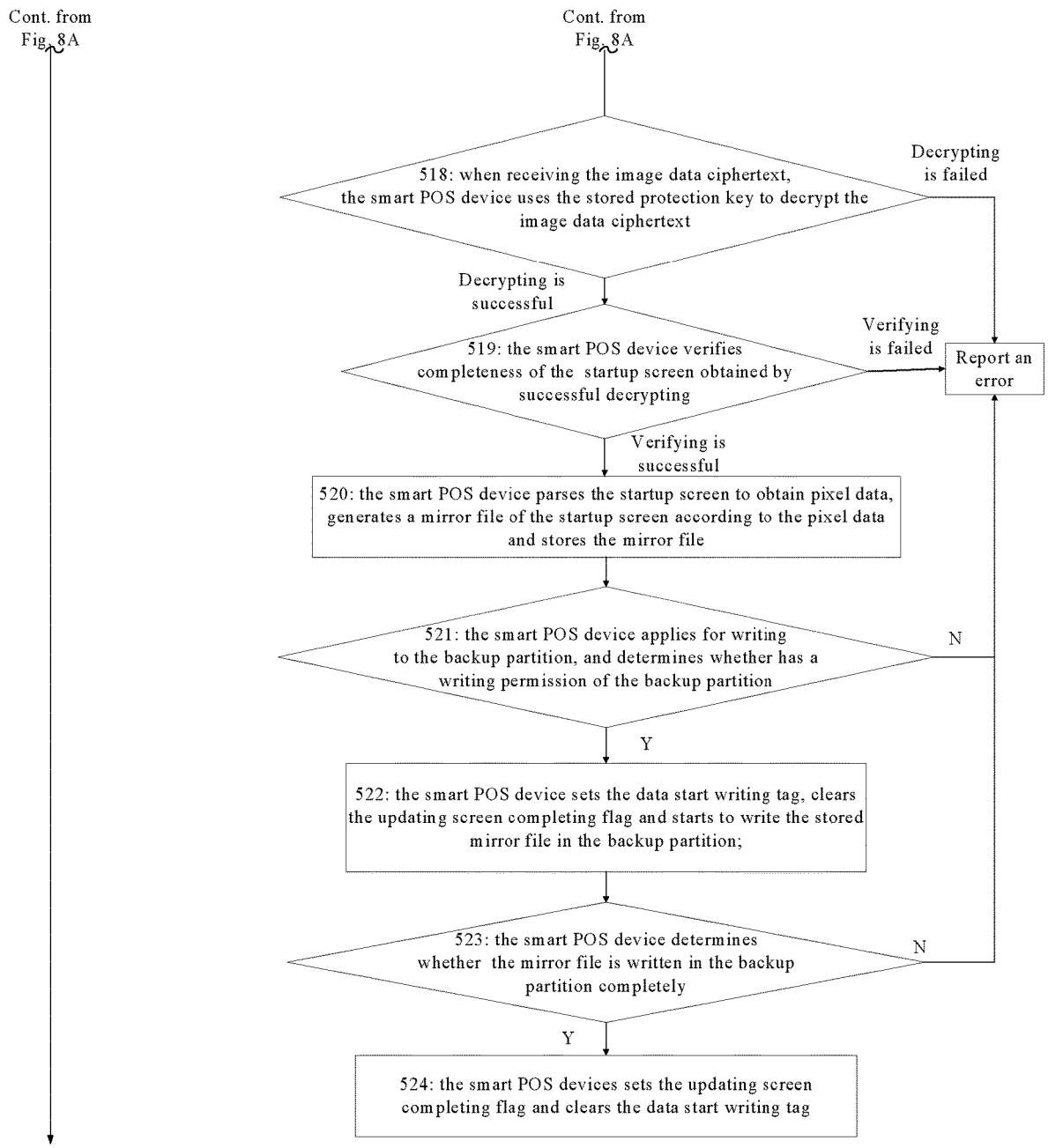

Embodiment 4 of the present disclosure provides an implementing method for replacing a startup screen of a smart POS device. In the present embodiment, what the smart POS device received is mirror file. As shown by FIG. 6A and FIG. 6B, the method of the present embodiment includes:

Step401: when detecting a startup, the smart POS device checks whether an updating screen completing flag exists, if yes, executes Step408, otherwise, executes Step402;

Step402: the smart POS device determines whether a data start writing tag exists, if yes, executes Step404, otherwise, executes Step403;

Step403: the smart POS device reads a screen mirror file from a default startup screen partition, takes the screen mirror file as a parameter to invoke a display driver program to display a default startup screen, executes Step409;

Step404: the smart POS device applies for writing to a backup partition, determines whether has a writing permission of the backup partition, if yes, executes Step405, if no, executes Step403;

Step405: the smart POS device starts to write a stored mirror file in the backup partition;

if power off or forced shutdown happens on the smart POS device in the process of writing the mirror file of Step405 or Step414 in the last startup process so as to write parts of data in the backup partition, in Step405 after startup this time and before writing the mirror file in the backup partition, the method further includes: the smart POS device deletes the data in the backup partition; or in Step405 the smart POS device updates the data in the backup partition with the mirror file, i.e. the mirror file is written in the backup partition by covering;

Step406: the smart POS device determines whether the mirror file is written into the backup partition completely, if yes, executes Step407, otherwise, executes Step403;

in an implementation, if determining result of Step406 is no, the method further includes: the smart POS device deletes the data in the backup partition;

Step407: the smart POS device sets the updating screen completing flag, clears the data start writing tag, executes Step408;

Step408: the smart POS device reads the mirror file from the backup partition and takes the mirror file as a parameter, invokes the display driver program to display corresponding startup screen, executes Step409;

in the present embodiment, the process of implementing Step408 is identical to Step208 in Embodiment 2, no more detail is given here;

Step409: when the smart POS device receives an image data ciphertext, uses a stored protection key to decrypt the image data ciphertext, if decrypting is successful, executes Step410.

Specifically, in the present embodiment, before Step409, the method further includes:

StepQ1, the smart POS device generates a protection key and stores the protection key, uses a TLS certificate to verify an activating instruction when receiving the activating instruction sent from a server, if verifying is successful, the smart POS device generates a successful activation response according to the protection key and device information and sends the successful activation response to the server, the server parses the received successful activation response and correspondingly stores the protection key and the device information obtained by parsing; the device information includes device type;

in an implementation, before StepQ1, the method further includes: the smart POS device generates a signing key pair and stores the signing key pair, sends a signing public key to the server; the server receives the signing public key and stores the signing public key;

in an implementation, generating and storing the protection key in the present embodiment can be performed after the activating instruction is verified successfully;

StepQ2: when the server receives an updating triggering information of a user, the server sends a startup screen updating request to the smart POS device; the smart POS device receives the startup screen updating request and sends the system information to the server; the server converts a format of a startup screen to raw data format to obtain screen data after receiving the system information, acquires pixel data from the screen data, determines whether the stored startup screen matches the received system information according to the pixel data, if they are matched, the server generates a mirror file of the startup screen according to the pixel data, performs hash computation on the mirror file to obtain a mirror file hash value, encrypts the mirror file hash value and the mirror file by using the protection key corresponding to the system information to obtain image data ciphertext and sends the image data ciphertext to the smart POS device, if they are not matched, reports an error;

in the present embodiment, the device information and the system information are in one-to-one correspondence; in this case, the system information includes: CPU manufacturer, device type and screen related information, for example, screen display resolution;

specifically, the server determines whether the stored startup screen matches the received system information is: the server determines whether the stored startup screen matches the screen display resolution in the received system information, and/or determines whether structure for making the mirror file matches the received CPU manufacturer in the received system information;

in an implementation, StepQ2 can be replaced with that: when the server receives updating triggering information of a user, the server sends a startup screen updating request to the smart POS device, the smart POS device sends the system information to the server after receiving the startup screen updating request, the server converts the format of the startup screen to raw data format after the server receives the system information to obtain screen data, obtains pixel data from the screen data, determines whether the pixel data matches the screen display resolution in the received system information, if the pixel data matches the screen display resolution, the server generates the mirror file of the startup screen according to the pixel data, performs hash computation on the mirror file to obtain a mirror file hash value, uses the protection key corresponding to the system information to encrypt the mirror file hash value and the mirror file to obtain image data ciphertext, sends the image data ciphertext to the smart POS device; if the pixel data does not match the screen display resolution, the server adjusts pixels of pixel data according to the screen display resolution in the system information, generates mirror file of the startup screen according to the adjusted pixel data, performs hash computation on the mirror file to obtain a mirror file hash value, uses the protection key corresponding to the system information to encrypt the mirror file hash value and the mirror file to obtain image data ciphertext and sends the image data ciphertext to the smart POS device;

in an implementation, StepQ2 can be replaced by that: when the server receives updating triggering information of a user, the server sends a startup screen updating request to the smart POS device, the smart POS device sends the system information to the server after receiving the startup screen updating request, the server determines whether structure of making mirror matches CPU manufacturer in the system information after receiving the system information, if yes, the server converts the format of the startup screen to raw data format to obtain screen data, obtains pixel data from the screen data, determines whether the pixel data matches the screen display resolution in the received system information, if the pixel data matches the screen display resolution, the server generates a mirror file of startup screen according to the pixel data, performs hash computation on the mirror file to obtain a mirror file hash value, uses the protection key corresponding to the system information to encrypt the mirror file hash value and the mirror file to obtain image data ciphertext, sends the image data ciphertext to the smart POS device; if the pixel data does not match the screen display resolution in the received system information, the server adjusts pixels of the pixel data according to the screen display resolution in the system information, generates a mirror file of startup screen according to the adjusted pixel data, performs hash computation on the mirror file to obtain a mirror file hash value, uses the protection key corresponding to the system information to encrypt the a mirror file hash value and the mirror file to obtain image data ciphertext and sends the image data ciphertext to the smart POS device; otherwise, reports an error;

in an implementation, encrypting the mirror file hash value and the mirror file by using the protection key corresponding to the system information to obtain image data ciphertext specifically includes: searching for device information according to the system information, acquiring a corresponding protection key according to the device information, encrypting the mirror file hash value and the mirror file by using the acquired protection key via 3DES encryption algorithm to obtain image data ciphertext;

in an implementation, if the server performs operation of replacing a startup screen on more than one smart POS devices at the same time, that is, the server processes more than one screens at the same time, then sends each screen to each corresponding smart POS device, a specific process is: when the server receives updating triggering information of a user, the server sends an startup screen updating request to a smart POS device corresponding to the user; after the smart POS device receives the startup screen updating request, each smart POS device sends the system information to the server; the server determines whether a stored startup screen matches the system information received currently, if yes, the server converts format of matched startup screen to a raw data format to obtain screen data, generates mirror file of the startup screen according to the screen data, performs hash computation on the mirror file to obtain a startup screen hash value, uses a stored protection key corresponding to the currently received system information to encrypt the mirror file hash value and the mirror file respectively to obtain image data ciphertext, sends the image data ciphertext to the current smart POS device;

in an implementation, the format of the startup screen in the present embodiment includes PNG, JPEG, BMP.

Specifically, in the present embodiment, the server acquiring the pixel data from the screen data includes:

StepA1: the server parses the screen data to obtain a screen information header and screen information data; determines whether the startup screen meets a requirement according to the screen information header and the system information, if yes, executes StepA2, otherwise, end; specifically, StepA1 of the present embodiment includes: the server parses the screen data to obtain screen information header and screen information data, reads the system information, determines whether the screen information header and the system information are matched, if yes, executes StepA2, otherwise, end;

in this case, the system information includes: CPU manufacturer, screen related information, for example, resolution and device type;

StepA2: the server determines whether the screen information data is compressed, if yes, executes StepA3, otherwise, executes StepA4;

StepA3: the server decompresses the screen information data according to a compression type in the screen information header, acquires the pixel data from a decompressing result according to a size of a raw pixel data file in the screen information header;

StepA4: the server acquires the pixel data from the screen information data according to the size of the raw pixel data file in the file header information.

The generating a mirror file of the startup screen according to the pixel data includes:

StepB1, the server creates a mirror file of the startup screen, sets a space with a preset size at a beginning position of the mirror file;

the mirror file of the present step in the present embodiment is an empty file, for example, the name of the file is splash.img, the preset size is 2 k;

StepB2: the server fills the mirror file header data structure according to screen description information, writes the mirror file header data structure in a position after the space with the preset size in the mirror file;

specifically, StepB2 includes that: the server fills structure logo_header according to the screen description information, writes the structure logo_header in the position after the space with the preset size in the mirror file splash.img after filling is completed;

for example, the screen description information includes: width information and height information of startup logo, for example, width=720, height=1280, the size of the mirror file splash.img after Step B2 is size of the structure plus 2 k, i.e. 512+2048=2560 bytes;

StepB3: the server compresses the pixel data by using an RLE compression algorithm, writes a compressing result in a newly created compression file, writes the compression file in a position after the mirror file header data structure in the mirror file;

for example, the compression file name is png.raw, after performing StepB3, the size of the mirror file splash.img equals to 2560 bytes plus size of png.raw;

StepB4: the server uses a stored signing public key to sign the mirror file header data structure and the compressed file in the mirror file, writes a signing result in the space with preset size in the mirror file and stores the finally obtained mirror file;

for example, a signing public key is used to sign the current mirror file splash.img, a signing result is written in a data area with 2 k which is at the beginning of the file splash.img; the mirror file finally obtained in StepB4 is shown as FIG. 3.

In the present embodiment, if there are more than one startup screen or files related to the startup screen, the mirror file in Step Q2 is another kind of structure, correspondingly, converting the format of the startup screen to a raw data format to obtain screen data, acquiring by the server pixel data from the screen data includes that:

StepC1: the server converts the format of each startup screen to the raw data format in turn to obtain screen data, takes the first screen data as current screen data;

StepC2: the server parses the current screen data to obtain a screen information header and screen information data; determines whether the current startup screen meets a requirement according to the screen information header and the system information, if yes, executes StepC3, otherwise, end;

specifically, StepC2 in the present embodiment includes: the server parses the screen data to obtain screen information header, reads system information, determines whether the screen information header and the system information are matched, if yes, executes StepC3, otherwise, end;

in this case, the system information includes: CPU manufacturer, screen related information, for example, resolution, and device type;

StepC3: the server determines whether the screen information data is compressed, if yes, executes StepC4, otherwise, executes StepC5;

StepC4: the server decompresses the screen information data according to the compression type in the screen information header, acquires pixel data of the current screen from a compressing result according to the size of the raw pixel data file in the screen information header, executes StepC6;

StepC5: the server acquires pixel data of the current screen from the screen information data according to the size of the raw pixel data file in the file header information and a preset acquiring rule, executes StepC6;

StepC6: the server determines whether the screen data is processed completely, if yes, keep on executing, otherwise, takes next screen data as current screen data, go back to StepC2.

The generating a mirror file of the startup screen according to the pixel data includes:

StepD1: the server creates a mirror file of the startup screen;

in the present embodiment, the mirror file of the present step is an empty file, for example, the name of the file is splash.img;

Step D2: the server creates a signature structure and writes the signature structure in a header of the mirror file;

for example, in StepD2, signature structure img_header is created and written in a header of the mirror file splash.img;

StepD3: the server creates description structures, fills the description structures with screen information, writes the description structure in turn at a position after the signature structure in the mirror file;

for example, in StepD3, a structure zip_header is created, total number of screens and description information of each screen, for example, size of screen, are used to fill the structure zip_header, after filling, the zip_header is written at a position after the signature structure of the file splash.img;

StepD4: the server concatenates all pixel data according to a preset order, compresses a concatenating result by using the RLE compression algorithm, writes a compressing result in a newly created compression file;

for example, there are 42 screens in the present embodiment, pixel data are extracted in turn from the 42 screens to obtain 42 raw files, the 42 files are concatenated according to a preset order, the RLE compression algorithm is used to compress a concatenating result to generate a compression file pictures.raw;

StepD5: the server writes the compression file at a position after the description structure in the mirror file;

StepD6: the server uses a stored signing public key to sign the description structures and the compression file in the mirror file, writes a signing result in the signature structure in the mirror file, stores the finally obtained mirror file.

in the present embodiment, the structural diagram of the mirror file of another kind of structure after StepD6 is shown as FIG. 4;

in an implementation, sending the image data ciphertext to the smart POS device in the present embodiment specifically is: sending the image data ciphertext to the Smart POS device by adopting USB/Internet via TMS.

Step410: the smart POS device verifies completeness of the mirror file obtained by successful decrypting, if verifying is successful, stores the mirror file, executes Step411, if verifying is failed, reports an error;

in the present embodiment, Step 410 includes: performing hash computation on the mirror file obtained by successful decrypting, determining whether a result of performing hash computation is identical to the mirror file hash value obtained by successful decrypting, if yes, the mirror file is completed and verifying is successful, executes Step411, otherwise, the mirror file is not completed, reports an error;

Step411: the smart POS device applies for writing to the backup partition, and determines whether has a writing permission of the backup partition, if yes, executes StepS412; otherwise, reports an error;

Step412: the smart POS device sets the data start writing tag, clears the updating screen completing flag and starts to write the stored mirror file in the backup partition;

in an implementation, if the backup partition has data, in Step412, the mirror file is written in the backup partition by covering, or the existed data in the backup partition is cleared before writing the mirror file in the backup partition; i.e. the smart POS device sets the data start writing tag, clears the updating screen completing flag and starts to update the data of the backup partition with the mirror file; or the smart POS device sets the data start writing tag, clears the updating screen completing flag, deletes data in the backup partition and starts to write the mirror file in the backup partition;

in an implementation, in Step412, in the process of writing the mirror file in the backup partition, power-off or forced shut up may happen to the smart POS device;

Step413: the smart POS device determines whether the mirror file is written in the backup partition completely, if yes, executes Step414, otherwise, reports an error;

in an implementation, if in Step412, the data is written directly, when the smart POS device determines that the mirror file is not written in the backup partition completely in Step413, the method further includes: the smart POS device deletes the data in the backup partition, i.e. when the smart POS device determines that the mirror file is not written in the backup partition completely, the smart POS device deletes the data in the backup partition, or the smart POS device deletes the data in the backup partition before writing data upon startup of the device next time; if in Step412, the data is written by covering, in Step413, when the smart POS device determines that the mirror file is not written in the backup partition completely, the smart POS device reports an error;

Step414: the smart POS device sets the updating screen completing flag and clears the data start writing tag.

In the present embodiment, at the time of the smart POS device powering on, if the smart POS device determines that the updating screen completing flag exists, i.e. the smart POS device detects that backup partition has a completed mirror file, the smart POS device displays a corresponding screen according to the mirror file in the backup partition; if the smart POS device determines that the updating screen completing flag and the data start writing tag do not exist, i.e. the smart POS device detects that backup partition has no mirror file, the smart POS device displays a default screen according to a mirror file in the default startup screen partition, if the smart POS device determines that no updating screen completing flag exists but the data start writing tag exists, i.e. the smart POS device detects that an uncompleted mirror file exists in the backup partition, the smart POS device rewrites the stored mirror file in the backup partition and displays a corresponding screen according to the mirror file in the backup partition after writing the stored mirror successfully. In the present embodiment, the image data ciphertext received by the smart POS device is obtained by that the server encrypts the mirror file generated according to the startup screen and the mirror file hash value, transferring the mirror file after encrypting operation makes the process of replacing a startup screen safer and reliable, the smart POS device stores a completed mirror file and writes the mirror file in the backup partition in such way that the smart POS device can use the mirror file upon startup next time; even if exception happens in the process of writing the mirror file in the backup partition which leads to failure, the stored mirror file can be rewritten in the backup partition when the smart POS device powers up next time. In the present embodiment, a backup partition is set; when the smart POS device powers up, the smart POS device can replace the startup screen independently according to the mirror file in the backup partition and no updating firmware is required, of which operating is safe, convenient and fast and product competitiveness is improved. In addition, a user can replace startup screen at any time, which is convenient to use. In the method of the present embodiment, even if power off or forced shut up happens in the process of writing the mirror file in the backup partition, the mirror file can be rewritten when the smart POS device powers up next time, and when the mirror file is written successfully, a new startup screen is displayed upon startup, the new startup screen may be a picture, or a video or animation, or other forms.

Embodiment 5

Embodiment 5 of the present disclosure provides an implementing method for replacing a startup screen of a smart POS device. In the present embodiment, what the smart POS device received is a startup screen. As shown by FIG. 7A, FIG. 7B, FIG. 8A and FIG. 8B, the method of the present embodiment includes:

Step501: when detecting a startup, the smart POS device checks whether an updating screen completing flag exists, if yes, executes Step508, otherwise, executes Step502;

Step502: the smart POS device determines whether a data start writing tag exists, if yes, executes Step504, otherwise, executes Step503;

Step503: the smart POS device reads a screen mirror file from a default startup screen partition, takes the screen mirror file as a parameter to invoke a display driver program to display a default startup screen, executes Step509;

Step504: the smart POS device applies for writing to a backup partition, and determines whether has a writing permission of the backup partition, if yes, executes Step505, if no, executes Step503;

Step505: the smart POS device starts to write a stored mirror file in the backup partition;

if power off or forced shutdown happens on the smart POS device in the process of writing the mirror file in the backup partition of Step505 or Step522 in the last startup process so as to write parts of data in the backup partition, Step505 after startup this time can be replaced by that: the smart POS device deletes the data in the backup partition and starts to write the mirror file in the backup partition or the smart POS device updates the data in the backup partition with the mirror file, i.e. the smart POS device writes the mirror file in the backup partition by covering;

Step506: the smart POS device determines whether the mirror file is written into the backup partition completely, if yes, executes Step507, otherwise, executes Step503;

in an implementation, if determining result of Step506 is no, the method may further include: the smart POS device deletes the data in the backup partition;

Step507: the smart POS device sets the updating screen completing flag, clears the data start writing tag, executes Step508;

Step508: the smart POS device reads the mirror file from the backup partition and takes the mirror file as a parameter, invokes the display driver program to display a corresponding startup screen, executes Step509;

in the present embodiment, implementing process of Step508 is the same as Step208 in Embodiment 2, no more detail is given here;

Step509: when receiving an activating instruction sent from the server, the Smart POS device uses a TLS certificate to verify the activating instruction, if verifying is successful, executes Step510, if verifying is failed, reports an error;

in an implementation, after the smart POS device starts up and before Step509, the method further includes: the smart POS device generates a signing key pair and stores the signing key pair, sends a signing public key to the server; the server receives the signing public key and stores the signing public key;

Step510: the smart POS device generates a protection key and stores the protection key, generates a successful activation response according to the protection key and device information and returns the successful activation response to the server;

in the present embodiment, the device information includes a device type;

Step511: the server parses the received successful activation response and corresponding stores the protection key and the device information which are obtained by parsing;

Step512: when the server receives an updating triggering information of a user, the server sends an startup screen updating request to the smart POS device;

in an implementation, if performing operation of replacing a startup screen on more than one smart POS devices at the same time, Step503 specifically is: when the server receives the updating trigger information of the user, the server sends the startup screen updating request to all the smart POS devices in button triggering information;

Step513: after receiving the startup screen updating request, the smart POS device sends system information to the server;

in the present embodiment, the device information and the system information are in one-to-one correspondence; where, the system information includes: CPU manufacturer, device type and screen related information, for example, resolution;

in an implementation, if performing operation of replacing a startup screen on more than one smart POS devices at the same time, Step504 specifically is that: after each smart POS device receives the startup screen updating request, each smart POS device sends its own system information to the server;

Step514: the server determines whether a stored startup screen matches screen display resolution in the received system information, if yes, executes Step515, otherwise, executes Step516;

specifically, in the present embodiment, Step514 includes: the server converts the format of startup screen to RAW data format to obtain screen data, acquires pixel data from the screen data, determines whether the stored startup screen matches the screen display resolution in the received system information according to the pixel data, if yes, executes Step515, otherwise, executes Step516;

Step515: the server performs hash computation on the startup screen to obtain a startup screen hash value, uses the protection key corresponding to the system information to encrypt the startup screen hash value and the startup screen to obtain an image data ciphertext, executes Step517;

in the present embodiment, using the protection key corresponding to the system information to encrypt the startup screen hash value and the startup screen to obtain an image data ciphertext specifically includes: searching for the device information according to the system information, acquiring the protection key corresponding to the device information, using the acquired protection key to encrypt the startup screen hash value and the startup screen via a 3DES encryption algorithm to obtain the image data ciphertext;

in an implementation, if the server performs operation of replacing a startup screen on more than one smart POS devices at the same time, Step515 specifically is: performing hash computation on the matched startup screen to acquire the startup screen hash value, using the stored protection key corresponding to the currently received system information to encrypt the startup screen hash value and the matched startup screen to acquire the image data ciphertext, in Step517, sending the image data ciphertext to the smart POS device corresponding to the current system information and taking a next unprocessed system information as current system information, executes Step514, till all system information are processed completely;

Step516: the server adjusts pixels of the pixel data according to the screen display resolution in the system information and stores a startup screen corresponding to the adjusted pixel data, performs hash computation on the corresponding startup screen to obtain a startup screen hash value, uses the protection key corresponding to the system information to encrypt the startup screen hash value and the corresponding startup screen to obtain an image data ciphertext, executes Step517;

Step517: the server sends the image data ciphertext to the smart POS device;

in an implementation, sending the image data ciphertext to the smart POS device specifically is: transferring the image data ciphertext to the smart POS device by using USB/Internet via TMS (Terminal Management System);

Step518: when receiving the image data ciphertext, the smart POS device uses the stored protection key to decrypt the image data ciphertext, if decrypting is successful, executes Step519; if decrypting is failed, reports an error;

Step519: the smart POS device verifies completeness of the startup screen obtained by successful decrypting, if verifying is successful, executes Step520, otherwise, verifying is failed, reports an error;

in the present embodiment, verifying completeness of the screen data includes: performing hash computation on the startup screen obtained by successful decrypting, determining whether a result of hash computation matches the startup screen hash value obtained by successful decrypting, if yes, verifying is successful, otherwise, verifying is failed;

Step520: the smart POS device parses the startup screen to obtain pixel data, generates a mirror file of the startup screen according to the pixel data and stores the mirror file;

in the present embodiment, implementing process of generating the mirror file of the startup screen according to the pixel data in Step520 is identical to Step211 of Embodiment 2, no more detail is given here;

Before Step520, the method further includes: the smart POS device generates a signing key pair, which includes a signing private key and a signing public key, and stores the signing key pair;

Step521: the smart POS device applies for writing to the backup partition, and determines whether has a writing permission of the backup partition, if yes, executes Step522; otherwise, reports an error;

Step522: the smart POS device sets the data start writing tag, clears the updating screen completing flag and starts to write the stored mirror file in the backup partition;

in an implementation, if data exists in the backup partition, Step522 may further be that: the smart POS device sets the data start writing tag, starts to update data in the backup partition by using the mirror file, i.e. starting to write the mirror file in the backup partition by covering; or the smart POS device sets the data startup writing tag, deletes data in the backup partition and starts to write the mirror file in the backup partition;

in an implementation, in case that power off or forced shutdown happens on the smart POS device in the process of writing the mirror file in the backup partition of Step522, parts of data have been written in the backup partition already at that time;

Step523: the smart POS device determines whether the mirror file is written in the backup partition completely, if yes, executes Step524, otherwise, reports an error;

in an implementation, if determining result of Step523 is no, the method further includes: the smart POS device deletes data in the backup partition, i.e. when the smart POS device determines that the mirror file is not written in the backup partition completely, the smart POS device deletes the data in the backup partition, or the smart POS device deletes the data in the backup partition before the device writes data upon startup next time;

Step524: the smart POS devices sets the updating screen completing flag and clears the data start writing tag.

In an implementation, in all embodiments described above, determining whether the start up screen matches the system information can be performed on the smart POS device; after the smart POS device parses the startup screen to obtain the pixel data, the smart POS device determines whether the pixel data of the startup screen matches the system information, if yes, executes subsequent steps, otherwise, adjust the pixel data of the startup screen according to the system information, executes subsequent steps.

In the method of the present embodiment, if the smart POS device determines that the updating screen completing flag exists upon startup, i.e. the smart POS device detects that backup partition has a completed mirror file, the smart POS device displays a corresponding screen according to the mirror file in the backup partition; if the smart POS device determines that the updating screen completing flag and the data start writing tag do not exist, i.e. the smart POS device detects that backup partition has no mirror file, the smart POS device displays a default screen according to a mirror file in the default startup screen partition, if the smart POS device determines that no updating screen completing flag exists but the data start writing tag exists, i.e. the smart POS device determines that an uncompleted mirror file exists in the backup partition, the smart POS device rewrites the stored mirror file in the backup partition and displays a corresponding screen according to the mirror file in the backup partition after writing the stored mirror file successfully. After the server receives the startup screen updating request sent from the smart POS device, the startup screen and the startup screen hash value are encrypted to obtain the image data ciphertext, then the image data ciphertext is sent to the smart POS device, the startup screen is transferred after going through encryption operation, which makes the process of replacing a startup screen to be safer and reliable, a mirror file is generated by the smart POS device according to a completed startup screen and stored, then the stored mirror file is written into the backup partition, in such way that the smart POS device can use the mirror file upon startup next time; even if exception happens in the process of writing the mirror file in the backup partition which leads to failed writing, the stored mirror file can be rewritten in the backup partition when the smart POS device powers up next time. In the present embodiment, the backup partition is set, when the device starts up, the device can replace startup screen independently according to the mirror file in the backup partition and updating firmware is not required, such operating is safe, convenient and fast and product competitiveness is improved. In addition, a user can replace startup screen at any time, which is convenient to use. In the method of the present embodiment, even if power off or forced shut up happens in the process of writing the mirror file in the backup partition, the mirror file can be rewritten when the smart POS device powers up next time, and a new startup screen displays upon startup, which may be a picture, or a video, an animation, and the like, when the mirror file is written successfully.

Embodiment 6

Figure 9:
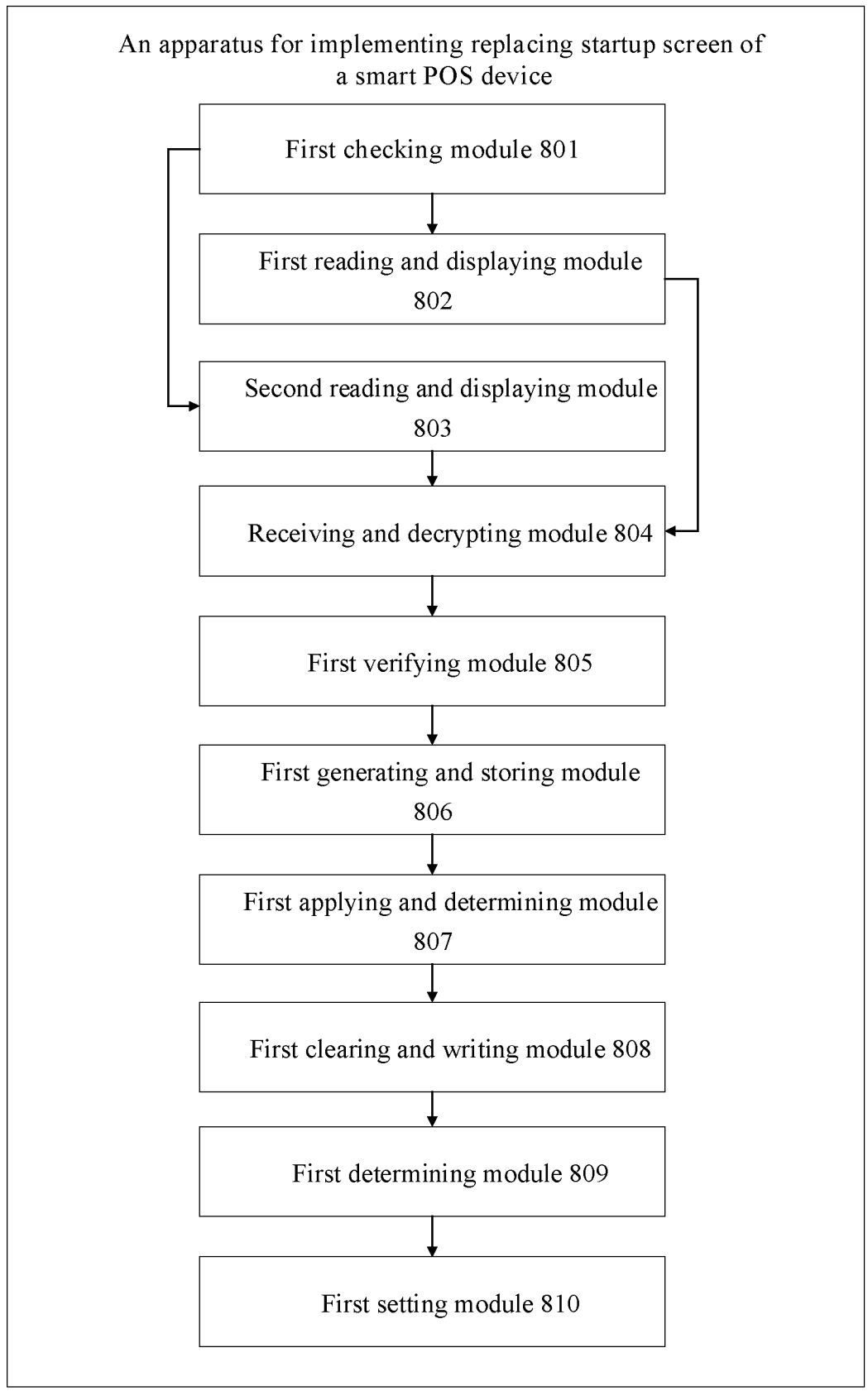
FIG. 9 is a block diagram of an apparatus for implementing the method for replacing a startup screen of a smart POS device provided by Embodiment 6 of the present disclosure.

Embodiment 6 of the present disclosure provides an implementing apparatus for replacing a startup screen of a smart POS device. As shown by FIG. 9, the apparatus includes:
  a first checking module 801 configured to, when detecting that the smart POS device powers up, check whether an updating screen completing flag exists, if yes, trigger a second reading and displaying module 803, otherwise, trigger a first reading and displaying module 802;
  the first reading and display module 802 configured to read a screen mirror file from a default startup screen partition and take the screen mirror file as a parameter, invoke a display driver program to display a default startup screen and trigger a receiving and decrypting module 804;
  the second reading and displaying module 803 configured to read a mirror file from a backup partition and take the read mirror file as a parameter, invoke the display driver program to display a corresponding startup screen and trigger the receiving and decrypting module 804;
  the receiving and decrypting module 804 configured to, when receiving an image data ciphertext, decrypt the image data ciphertext by using a stored protection key; and trigger a first verifying module 805 if decrypting is successful;
  the first verifying module 805 configured to verify data obtained by successful decrypting, trigger a first generating and storing module 806 if verifying successful, reports an error if verifying is failed;
  the first generating and storing module 806 configured to generate a mirror file of a startup screen according to the data obtained by successful decrypting and store the mirror file;
  a first applying and determining module 807 configured to apply for writing to the backup partition, and determine whether has a writing permission of the backup partition, if yes, trigger a first clearing and writing module 808, otherwise, reports an error;
  the first clearing and writing module 808 configured to clear the updating screen completing flag and start to write the stored mirror file in the backup partition;
  the first determining module 809 configured to determine whether the mirror file is written in the backup partition completely, if yes, trigger a first setting module 810, otherwise, reports an error;
  the first setting module 810 configured to set the updating screen completing flag;

where, the first clearing and writing module 808 is further configured to set a data start writing tag;
  the first setting module 810 is further configured to clear the data start writing tag.
The apparatus further includes:
  a second determining module configured to, when the first checking module 801 checks that updating screen completing flag does not exist, determine whether the data start writing tag exists, if yes, trigger a second applying and determining module, otherwise, trigger the first reading and displaying module 802;
  the second applying and determining module configured to apply for writing to the backup partition, determine whether has a writing permission of the backup partition, if yes, trigger the first writing module, otherwise, trigger the first reading and displaying module 802;
  a first writing module configured to start to write the stored mirror file in the backup partition;
  a second determining module configured to determine whether the mirror file has completely written into the backup partition, if yes, trigger the first setting and clearing module, otherwise, trigger the first reading and displaying module 802;
  the first setting and clearing module configured to set the updating screen completing flag, clear the data start writing tag and trigger the second reading and displaying module 803.

In an implementation, the second reading and displaying module 803 includes:
  a first reading and verifying unit configured to read the mirror file in the backup partition, acquire a signing result from the mirror file, verify the mirror file by using the signing result, if verifying is successful, trigger an acquiring and decompressing unit, if verifying is failed, reports an error, end;
  the first acquiring and decompressing unit configured to acquire a mirror file head data structure from the mirror file, acquire screen description information from the mirror file head data structure; acquire a decompressing result from the mirror file, decompress the compression result by using a compression algorithm to obtain pixel data;
  a first invoking and displaying unit configured to take the screen description information and the pixel data as parameters, invoke the display driver program to display a corresponding startup screen, trigger the receiving and decrypting module 804.

In an implementation, the second reading and displaying module 803 includes:
  the second reading and verifying unit configured to read the mirror file from the backup partition, acquire a signing result from the mirror file, verify the mirror file by using the signing result, if verifying is successful, trigger a first acquiring unit, if verifying is failed, reports an error, end;
  the first acquiring unit configured to acquire description structure from the mirror file, acquire screen information including total number of screens and description information of each screen from the description structure;
  a reading-decompressing-separating unit configured to read data after the description structure from the mirror file, decompress the read data by using a compression algorithm to obtain all pixel data, separate all pixel data into individual pixel data according to the total number of screens and description information of each screen in the screen information;

a second acquiring unit configured to acquire corresponding pixel data from the individual pixel data obtained by separating according to a preset rule;

a second invoking and displaying unit configured to take the acquired pixel data and description information of a corresponding screen as parameters, invoke the display driver program to display the corresponding startup screen and trigger the receiving and decrypting module 804.

In the present embodiment, there are three kinds of data obtained by the receiving and decrypting module 804 by performing decrypting successfully; when the first kind of data obtained by successful decrypting is startup screen, the first verifying module 805 specifically is configured to verify completeness of the startup screen obtained by successful decrypting, if verifying is successful, trigger the first generating and storing module 806, if verifying is failed, reports an error;

the first generating and storing module 806 specifically is configured to parse the startup screen to obtain pixel data, generate a mirror file of the startup screen according to the pixel data and store the mirror file.

The apparatus of the present embodiment further includes a first generating and storing module, the first receiving and verifying module and the first receiving and sending module;

the first generating and storing module is configured to generate a protection key and store the protection key;

the first receiving and verifying module is configured to use a TLS certificate to verify an activating instruction when receiving the activating instruction sent from the server, if verifying is successful, generate a successful activation response according to the protection key and the device information and send the successful activation response to the server;

the server is configured to parse the received successful activation response and correspondingly store the protection key and the device information obtained by parsing: the server sends a startup screen updating request to the smart POS device when the server receives updating triggering information of a user;

the first receiving and sending module configured to send the system information to the server when receiving the startup screen updating request;

the server is further configured to determine whether the stored startup screen matches the received system information, if yes, to perform hash computation on the startup screen to obtain a startup screen hash value, use the protection key corresponding to the system information to encrypt the startup screen hash value and the startup screen to obtain an image data ciphertext, send the image data ciphertext to the smart POS device, if no, to reports an error.

In an implementation, the server determines whether the stored startup screen matches the received system information specifically is that the server determines whether the stored startup screen and the screen displaying resolution in the received system information are matched.

When the server determines that the stored startup screen does not match the screen display resolution in the received system information, the server adjusts pixels of the startup screen according to the screen display resolution in the system information and stores the adjusted startup screen, performs hash computation on the adjusted startup screen to obtain an adjusted startup screen hash value, uses the protection key corresponding to the system information to encrypt the adjusted startup screen hash value and the adjusted startup screen to obtain an image data ciphertext, sends the image data ciphertext to the smart POS device.

The use the protection key corresponding to the system information to encrypt the startup screen hash value and the startup screen to obtain an image data ciphertext specifically is: searching for device information according to the system information, acquiring a corresponding protection key according to the found device information, using the acquired protection key to encrypt the startup screen hash value and the startup screen with an encrypting algorithm to obtain the image data ciphertext.

In an implementation, the first generating and storing module 806 in the present embodiment includes:

a first converting unit configured to convert the format of the startup screen to a raw data format to obtain screen data;

a first parsing and determining unit configured to parse the screen data to obtain a screen information header and screen information data, determines whether the screen information header and the system information meet a requirement, if yes, trigger a first determining unit, otherwise, end;

the first determining unit configured to determine whether the screen information data is compressed, if yes, trigger a first decompressing and acquiring unit, otherwise, trigger a third acquiring unit;

the first decompressing and acquiring unit configured to decompress the screen information data according to a compression type in the screen information header, acquire pixel data from a decompressing result according to size of a raw pixel data file in the screen information header, and trigger a first creating and setting unit;

the third acquiring unit configured to acquire pixel data from the screen information according to size of a raw pixel data file in file header information, trigger the first creating and setting unit;

the first creating and setting unit configured to create a mirror file of the startup screen, set a space with a preset size at the beginning position of the mirror file;

a first filling and writing unit configured to create a mirror file header data structure and fill the mirror file header data structure with screen description information, write the mirror file header data structure in a position after the space with the preset size in the mirror file;

a first compressing and writing unit configured to compress the pixel data by using a compression algorithm, write a compressing result in a new created compression file, write the compression file in a position after the mirror file header data structure in the mirror file;

a first signing-writing-storing unit configured to sign the mirror file header data structure and the compressed file in the mirror file by using a stored signing public key, write a signing result in the space with the preset size in the mirror file and store the finally acquired mirror file.

In an implementation, there are more than one startup screens, the first generating and storing module 806 includes:

a second converting unit configured to convert the format of the startup screens to raw data format in turn to obtain screen data;

a second parsing and determining unit configured to parse screen data in turn to obtain screen information header and screen information data, determine whether the startup screen meets a requirement according to the screen information header and the system information, if yes, trigger a second determining unit executes, otherwise, end;

the second determining unit configured to determine in turn whether the screen information data is compressed, if yes, trigger a second decompressing and acquiring unit, otherwise, trigger a fourth acquiring unit;

the second decompressing and acquiring unit configured to decompress the screen information data according to the compression type in the screen information header in turn, acquire pixel data from a decompressing result according to the size of the raw pixel data file in the screen information header, trigger a first creating unit;

the fourth acquiring unit configured to acquire pixel data from the screen information data according to the size of the raw pixel data file in the file header information in turn, trigger the first creating unit;

the first creating unit configured to create a mirror file of startup screen;

a first creating and writing unit configured to create a signature structure and write the signature structure in a header of the mirror file;

a first creating-filling and -writing unit configured to create description structures, fill the description structures with screen information which includes total number of screen and description information of each screen, write the description structures in turn at a position after the signature structure in the mirror file;

a first concatenating-compressing-writing unit configured to concatenate all pixel data according to a preset order, compress a concatenating result by using a compression algorithm, write a compressing result in a newly created compression file;

a first writing unit configured to write the compression file at a position after the description structure in the mirror file in turn;

a second signing-writing-storing unit configured to sign the description structures and the compression file in the mirror file by using the stored signing public key, write a signing result in the signature structure in the mirror file and store the finally obtained mirror file.

In the present embodiment, there are three kinds of data obtained by the receiving and decrypting module 804 by performing decrypting successfully; the second kind is that the data obtained by successful decrypting is pixel data, the first verifying module 805 specifically is configured to verify completeness of the pixel data obtained by successful decrypting, if verifying is successful, trigger the first generating and storing module 806, if verifying is failed, reports an error;

the first generating and storing module 806 specifically is configured to generate the mirror file of the startup screen by using the pixel data and store the mirror file of the startup screen.

The apparatus of the present embodiment further includes a second generating and storing module, a second receiving and verifying module and as second receiving and sending module;

the second generating and storing module is configured to generate a protection key and store the protection key;

the second receiving and verifying module is configured to verify an activating instruction by using a TLS certificate when receiving the activating instruction sent from the server, if verifying is successful, to generate a successful activation response according to the protection key and the device information and send the successful activation response to the server.

The server is configured to parse the received successful activation response and correspondingly store the protection key and the device information obtained by parsing; when the server receives an updating triggering information of a user, the server sends a startup screen updating request to the smart POS device.

The second receiving and sending module is configured to send the system information to the server after receiving the startup screen updating request.

The server is further configured to convert a format of the startup screen to a raw data format to obtain screen data after receiving the system information, acquire pixel data from the screen data, determine whether the stored startup screen matches the received system information according to the pixel data, if they are matched, perform hash computation on the pixel data to obtain a pixel data hash value, encrypt the pixel data hash value and the pixel data by using the stored protection key corresponding to the received system information to obtain an image data ciphertext and send the image data ciphertext to the smart POS device, if they are not matched, reports an error.

In an implementation, the server determining whether the stored startup screen matches the received system information is that: the server determines whether the stored startup screen matches the screen display resolution in the received system information;

when the server determines that the stored startup screen does not match the screen display resolution in the received system information, the server adjusts pixels of the pixel data according to the screen display resolution in the system information, performs hash computation on the adjusted pixel data to obtain an adjusted pixel data hash value, uses the stored protection key corresponding to the received system information to encrypt the adjusted pixel data hash value and the adjusted pixel data to obtain an image data ciphertext and sends the image data ciphertext to the smart POS device;

the using stored the protection key corresponding to the received system information to encrypt the pixel data hash value and the pixel data to obtain an image data ciphertext includes: searching for device information according to the system information, acquiring a corresponding protection key according to the found device information, using the acquired protection key to encrypt the pixel data hash value and the pixel data with an encrypting algorithm to obtain the image data ciphertext.

In an implementation, acquiring the pixel data from the screen data includes:

StepH1: parsing the screen data to obtain screen information header and screen information data, determining whether the pixel data meets a requirement according to the screen information header and the system information, if yes, executes StepH2, otherwise, end;

StepH2: determining whether the screen information data is compressed, if yes, executes StepH3, otherwise, executes StepH4;

StepH3: decompressing the screen information data according to the compression type in the screen information header, acquiring pixel data from a decompressing result according to the size of the raw pixel data file in the screen information header;

StepH4: acquiring pixel data from the screen information according to the size of raw pixel data file in the file header information.

Correspondingly, the first generating and storing module 806 in the present embodiment includes:
- a second creating and setting unit configured to create a mirror file of the startup screen, set a space with a preset size at the beginning position of the mirror file;
- a second filling and writing unit configured to fill the mirror file header data structure with screen description information, write the mirror file header data structure in a position after the space with the preset size in the mirror file;
- a second compressing and writing unit configured to compress the pixel data by using a compression algorithm, write a compressing result in a new created compression file, write the compression file in the position after the mirror file header data structure in the mirror file;
- a third signing-writing-storing unit configured to use a stored signing public key to sign the mirror file header data structure and the compressed file in the mirror file, write a signing result in the space with the preset size in the mirror file and store the finally obtained mirror file.

In an implementation, there are more than one startup screens, converting the startup screen formation to raw data format to obtain screen data, acquiring pixel data from the screen data includes:
StepK1: the server converts the format of each startup screen to raw data format to obtain screen data in turn, takes the first screen data as current screen data;
StepK2: the server parses the current screen data to obtain a corresponding screen information header and screen information data, determines whether the current startup screen meets a requirement according to the screen information header and the system information, if yes, executes StepK3, otherwise, end;
StepK3: the server determines whether the screen information data is compressed, if yes, executes StepK4, otherwise, executes StepK5;
StepK4: the server decompresses the screen information data according to a compression type in the screen information header, acquires pixel data of current screen from a decompressing result according to the size of raw pixel data file in the screen information header, executes StepK6;
StepK5: the server acquires pixel data of the current screen from the screen information data in turn according to a size of a raw pixel data file in file header information and a preset acquiring rule, executes StepK6;
StepK6: the server determines whether the screen data is processed completely, if yes, keep on processing, otherwise, takes next screen data as current screen data, go back to StepK2.

Correspondingly, the first generating and storing module 806 in the present embodiment includes:
- a second creating unit configured to create a mirror file of startup screen;
- a second creating and writing unit configured to create a signature structure and write the signature structure in a header of the mirror file;
- a second creating-filling-writing unit configured to create description structures, acquire total number of screens and description information of each screen from the decrypting result, fill the description structures with screen information including total number of screens and description information of each screen, write the description structures in turn at a position after the signature structure in the mirror file;
- a second concatenating-compressing-writing unit configured to concatenate all pixel data obtained by decrypting according to a preset order, compress a concatenating result by using a compression algorithm and write a compressing result in a newly created compression file;
- a second writing unit configured to write the compression file at the position after the description structure in the mirror file in turn;
- a fourth signing-writing-storing unit configured to use the stored signing public key to sign the description structures and the compression file in the mirror file, write a signing result in the signature structure in the mirror file, store the mirror file obtained finally.

In the present embodiment, there are three kinds of data obtained by the receiving and decrypting module 804 by performing decrypting successfully; the third kind is that the data obtained by successful decrypting is mirror file, then the first verifying module 805 specifically is configured to verify completeness of the mirror file obtained by successful decrypting, if verifying is successful, trigger the first generating and storing module 806, if verifying is failed, reports an error.

The first generating and storing module 806 specifically is configured to store the mirror file obtained by successful decrypting.

The apparatus of the present embodiment further includes a third generating and storing module, a third receiving and verifying module and a third receiving and sending module.

The third generating and storing module is configured to generate a protection key and store the protection key;

The third receiving and verifying module is configured to verify an activating instruction by using a TLS certificate to when receiving the activating instruction sent from the server, if verifying is successful, generate a successful activation response according to the protection key and the device information and send the successful activation response to the server;

The server is configured to parse the received successful activation response and store the protection key and the device information obtained by parsing correspondingly; when the server receives an updating triggering information of a user, the server sends a startup screen updating request to the smart POS device.

The third receiving and sending module is configured to send the system information to the server after receiving the startup screen updating request.

The server is further configured to convert the format of the startup screen to a raw data format to obtain screen data after receiving the system information, acquire pixel data from the screen data, determine whether the stored startup screen matches the received system information according to the pixel data, if they are matched, generate a mirror file of the startup screen according to the pixel data, perform hash computation on the mirror file to obtain a mirror file hash value, encrypt the mirror file hash value and the mirror file by using the protection key corresponding to the system information to obtain an image data ciphertext and send the image data ciphertext to the smart POS device, if they are not matched, reports an error.

In an implementation, the server determines whether the stored startup screen matches the received system information is: the server determines whether the stored startup screen matches the screen display resolution in the received system information, and/or determines whether a structure for making the mirror file matches a CPU manufacturer.

When the server determines that the stored startup screen and the screen display resolution in the received system information are not matched or determines that the structure for making the mirror file matches the CPU manufacturer and that the stored startup screen and the screen display resolution in the system information are not matched, the server adjusts pixels of pixel data according to the screen display resolution in the system information, generates a mirror file of the startup screen according to the adjusted pixel data, performs hash computation on the mirror file to obtain a mirror file hash value, encrypts the mirror file hash value and the mirror file by using the protection key corresponding to the system information to obtain an image data ciphertext and sends the image data ciphertext to the smart POS device.

Encrypting the mirror file hash value and the mirror file by using the protection key corresponding to the system information to obtain an image data ciphertext specifically includes: searching for the device information according to the system information, acquiring the corresponding protection key according to the device information, encrypting the mirror file hash value and the mirror file by using the acquired protection key via an encryption algorithm to obtain the image data ciphertext:

In an implementation, acquiring the pixel data from the screen data includes:
- StepA1: parsing the screen data to obtain a screen information header and screen information data; determining whether the startup screen meets a requirement according to the screen information header and the system information, if yes, executes StepA2, otherwise, end;
- StepA2: determining whether the screen information data is compressed, if yes, executes StepA3, otherwise, executes StepA4;
- Step A3: decompressing the screen information data according to a compression type in the screen information header, acquiring the pixel data from a decompressing result according to a size of a raw pixel data file in the screen information header;
- StepA4: acquiring pixel data from the screen information data according to a size of the raw pixel data in the file header information.

Correspondingly, generating the mirror file of the startup screen according to the pixel data includes:
- StepB1: creating a mirror file of the startup screen, sets a space with a preset size at a beginning position of the mirror file;
- StepB2: filling the mirror file header data structure according to screen description information, writing the mirror file header data structure in a position after the space with the preset size in the mirror file;
- StepB3: compressing the pixel data by using a compression algorithm, writing a compressing result in a newly created compression file, writing the compression file in a position after the mirror file header data structure in the mirror file;
- StepB4: using a stored signing public key to sign the mirror file header data structure and the compressed file in the mirror file, writing a signing result in the space with the preset size in the mirror file and storing the finally obtained mirror file.

In an implementation, there are more than one startup screens, converting a format of a startup screen to a raw data format to obtain screen data, acquiring pixel data from the screen data includes:
- StepC1: the server converts the format of each startup screen to the raw data format in turn to obtain screen data, takes the first screen data as current screen data;
- StepC2: the server parses the current screen data to obtain a screen information header and screen information data; determines whether the current startup screen meets a requirement according to the screen information header and the system information, if yes, executes StepC3, otherwise, pr end;
- StepC3: the server determines whether the screen information data is compressed, if yes, executes StepC4, otherwise, executes StepC5;
- StepC4: the server decompresses the screen information data according to the compression type in the screen information header—in turn, acquires pixel data of the current screen from a compressing result according to the size of the raw pixel data file in the screen information header, executes StepC6;
- StepC5: the server acquires pixel data of the current screen from the screen information data according to the size of the raw pixel data file in the file header information and a preset acquiring rule, executes StepC6;
- StepC6: the server determines whether the screen data is processed completely, if yes, keep executing, otherwise, takes next screen data as current screen data, go back to StepC2.

Correspondingly, generating a mirror file of the startup screen according to the pixel data includes:
- StepD1: the server creates a mirror file of the startup screen;
- Step D2: the server creates a signature structure and writes the signature structure in a header of the mirror file;
- StepD3: the server creates description structures, fills the description structures with screen information including total number of screens and description information of each screen, writes the description structures in turn at a position after the signature structure in the mirror file;
- StepD4: the server concatenates all the acquired pixel data according to a preset order, compresses a concatenating result by using a compression algorithm, writes a compressing result in a newly created compression file;
- StepD5: the server writes the compression file at a position after the description structure in the mirror file;
- StepD6: the server uses a stored signing public key to sign the description structures and the compression file in the mirror file, writes a signing result in the signature structure in the mirror file, stores the finally obtained mirror file.

In an implementation, the first clearing and writing module 808 specifically is configured to set the data start writing tag, clear the updating screen completing flag and start to update the data in the backup partition with the mirror file; or specifically is configured to set the data start writing tag, clear the updating screen completing flag, delete data in the backup partition and start to write the mirror file in the backup partition.

In an implementation, an embodiment of the present disclosure provides a smart POS device, which includes at least one processor, a storage and an instruction stored in the storage and executed by the at least one processor, where the at least one processor executes the instruction to implement the method for implementing replacing a startup screen of a smart POS device in the above embodiment. When the smart POS device is a chip system, the smart POS device can be made up of a chip or includes a chip and other separating elements, which is not limited by the embodiments of the present application; the chip is coupled to a storage, to executes a computer program stored in the storage so as to perform the method of for implementing replacing a startup screen of a smart POS device in the above embodiment.

All or some of the above embodiment may be implemented by using software, hardware, firmware, or any combination thereof. When a software program is used to implement the embodiment, the embodiment may be implemented completely or partially in a form of a computer program product. The computer program product includes one or more computer programs. When the computer programs are loaded and executed on the smart POS device, the procedures or functions according to the embodiments of this application are all or partially generated. The computer programs may be stored in a computer-readable storage medium or may be transmitted from a computer-readable storage medium to another computer-readable storage medium. For example, the computer instructions may be transmitted from a base station, smart POS device, server, or data center to another base station, smart POS device, server, or data center in a wired (for example, a coaxial cable, an optical fiber, or digital subscriber line (DSL)) or wireless (for example, infrared, radio, or microwave) manner. The computer-readable storage medium may be any usable medium accessible by a smart POS device, or a data storage smart POS device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like. In the embodiment of the present disclosure, the smart POS device may include the foregoing apparatus.

Although the application is described in combination with the respective embodiments, in a procedure of implementing the application that claims protection, one of ordinary skill in the art may understand and implement another variation of the disclosed embodiments by viewing the accompanying drawings, disclosed content, and the appended claims. In the claims, "comprise" (comprising) does not exclude another component or step, and "a" or "one" does not exclude a case of plurality. A single processor or another unit may implement several functions enumerated in the claims. Some measures are recorded in dependent claims that are different from each other, but this does not mean that these measures cannot be combined to produce a great effect.

Although the application is described in combination with specific features and the embodiments thereof, it is clear that various modifications and combinations may be made to them without departing from the spirit and scope of the application. Correspondingly, the specification and accompanying drawings are merely example description of the application defined by the appended claims, and are considered as covering any of or all modifications, variations, combinations or equivalents in the scope of the application. It is clear that one of ordinary skill in the art can make various modifications and variations to the application without departing from the spirit and scope of the application. The application is intended to cover these modifications and variations of the application provided that they fall within the scope of protection defined by the claims of the present application and their equivalent technologies.

What is claimed is:

1. A method for implementing replacing a startup screen of a smart POS device, comprising:
    StepS1: checking, by the smart POS device, whether an updating screen completing flag exists when detecting a startup, if yes, executing StepS3, otherwise, executing StepS2;
    StepS2: reading, by the smart POS device, a screen mirror file from a default startup screen partition and taking the screen mirror file as a parameter, invoking a display driver program to display a default startup screen, executing StepS4;
    Step3: reading, by the smart POS device, a mirror file from a backup partition and taking the mirror file as a parameter, invoking the display driver program to display a corresponding startup screen, executing StepS4;
    StepS4: decrypting, by the smart POS device, an image data ciphertext by using a stored protection key when receiving the image data ciphertext, if decrypting is successful, executing StepS5;
    StepS5: verifying, by the smart POS device, data obtained by successful decrypting, if verifying is successful, executing StepS6, if verifying is failed, reporting an error;
    StepS6: generating, by the smart POS device, a mirror file of the startup screen according to the data obtained by successful decrypting and storing the mirror file;
    StepS7: applying, by the smart POS device, for writing to the backup partition, and determining whether has a writing permission of the backup partition, if yes, executing StepS8; otherwise, reporting an error;
    StepS8: clearing, by the smart POS device, the updating screen completing flag and starting to write the stored mirror file in the backup partition;
    StepS9: determining, by the smart POS device, whether the mirror file is written in the backup partition completely, if yes, executing StepS10, otherwise, reporting an error;
    StepS10: setting, by the smart POS device, the updating screen completing flag.

2. The method according to claim 1, wherein StepS8 further comprises:
    setting, by the smart POS device, a data start writing tag;
        StepS10 further comprises: clearing, by the smart POS device, the data start writing tag;
        if no in StepS1, before executing StepS2, the method further includes:
        StepP1: determining, by the smart POS device, whether the data start writing tag exists, if yes, executing StepP2, otherwise, executing StepS2;
        StepP2: applying, by the smart POS device, for writing into the backup partition and determining whether has writing permission of backup partition, if yes, executing StepP3, otherwise, executing StepS2;
        StepP3: starting to write, by the smart POS device, the stored mirror file in the backup partition;
        StepP4: determining, by the smart POS device, whether the mirror file is written into the backup partition completely, if yes, executing StepP5, otherwise, executing StepS2;
        StepP5: setting, by the smart POS device, the updating screen completing flag, clearing the data start writing tag, executing StepS3.

3. The method according to claim 1, wherein StepS3 comprises:
   StepS3-1': reading, by the smart POS device, a mirror file from a backup partition, acquiring a signing result from the mirror file, verifying the mirror file by using the signing result, if verifying is successful, executing StepS3-2', if verifying is failed, reporting an error, ending;
   StepS3-2': acquiring, by the smart POS device, a mirror file header data structure from the mirror file, acquiring screen description information from the acquired mirror file header data structure; acquiring a compression result from the mirror file, decompressing the compression result by using a compression algorithm to obtain pixel data;
   StepS3-3': taking, by the smart POS device, the screen description information and the pixel data as parameters, invoking the display driver program to display a corresponding startup screen, executing StepS4.

4. The method according to claim 1, wherein StepS3 comprises:
   StepS3-1: reading, by the smart POS device, the mirror file from the backup partition, acquiring a signing result from the mirror file, verifying the mirror file by using the signing result, if verifying is successful, executing StepS3-2, if verifying is failed, reporting an error, ending;
   StepS3-2: acquiring, by the smart POS device, description structure from the mirror file, acquiring screen information including total number of screens and description information of each screen from the description structure;
   StepS3-3: reading, by the smart POS device, data after the description structure from the mirror file, decompressing the read data by using a compression algorithm to obtain all pixel data, separating all pixel data into individual pixel data according to the total number of screens and description information of each screen in the screen information;
   StepS3-4: according to a preset rule, acquiring, by the smart POS device, corresponding pixel data from the individual pixel data obtained by separating;
   StepS3-5: taking, by the smart POS device, the acquired pixel data and the description information of a corresponding screen as parameters, invoking the display driver program to display the corresponding startup screen, executing StepS4.

5. The method according to claim 1, wherein before StepS4, the method further comprises:
   StepT1: generating, by the smart POS device, a protection key and storing the protection key, using a TLS certificate to verify an activating instruction when receiving the activating instruction sent from a server, if verifying is successful, generating, by the smart POS device, a successful activation response according to the protection key and the device information and sending the successful activation response to the server, parsing, by the server, the received successful activation response and storing the protection key and the device information obtained by parsing correspondingly;
   StepT2: when the server receives an updating triggering information of a user, sending, by the server, a startup screen updating request to the smart POS device; receiving, by the smart POS device, the startup screen updating request and sending system information to the server; determining, by the server, whether the stored startup screen matches the received system information, if they are matched, performing, by the server, hash computation on the startup screen to obtain a startup screen hash value, encrypting the startup screen hash value and the startup screen by using the protection key corresponding to the system information to obtain an image data ciphertext and sends the image data ciphertext to the smart POS device, if they are not matched, reporting an error;
   StepS5 comprises: verifying, by the smart POS device, completeness of the startup screen obtained by successful decrypting, if verifying is successful, executing StepS6, if verifying is failed, reporting an error;
   StepS6 specifically is: parsing, by the smart POS device the startup screen to obtain the pixel data, generating the mirror file of the startup screen according to the pixel data and storing the mirror file.

6. The method according to claim 5, wherein the determining, by the server, whether the stored startup screen matches the received system information specifically is: determining, by the server, whether the stored startup screen matches screen display resolution in the received system information;
   when the server determines that the stored startup screen does not match the screen display resolution in the received system information, adjusting, by the server, pixels of the startup screen according to the screen display resolution in the system information and storing the adjusted startup screen, performing hash computation on the adjusted startup screen to obtain an adjusted startup screen hash value, using the protection key corresponding to the system information to encrypt the adjusted startup screen hash value and the adjusted startup screen to obtain an image data ciphertext, sending the image data ciphertext to the smart POS device.

7. The method according to claim 1, wherein StepS5 comprises:
   verifying, by the smart POS device, completeness of the startup screen obtained by successful decrypting, if verifying is successful, executing StepS6, otherwise, verifying is failed, reporting an error;
   StepS6 comprises:
   StepS6-0': converting, by the smart POS device, a format of the startup screen to a raw data format to obtain screen data;
   Step S6-1': parsing, by the smart POS device, the screen data to obtain screen information header and screen information data; determining whether the startup screen meets a requirement according to the screen information header and the system information, if yes, executing StepS6-2', otherwise, ending;
   StepS6-2': determining, by the smart POS device, whether the screen information data is compressed, if yes, executing StepS6-3', otherwise, executing StepS6-4';
   Steps6-3': decompressing, by the smart POS device, the screen information data according to a compression type in the screen information header, acquiring pixel data from a decompressing result according to a size of a raw pixel data file in the screen information header, executing StepS6-5';
   StepS6-4': acquiring, by the smart POS device, pixel data from the screen information data according to a size of a raw pixel data file in file header information, executes StepS6-5';

StepS6-5': creating, by the smart POS device, a mirror file of the startup screen, setting a space with a preset size at a beginning position of the mirror file;

Step S6-6': creating, by the smart POS device, a mirror file header data structure and filling the mirror file header data structure with screen description information, writing the mirror file header data structure in a position after the space with the preset size in the mirror file;

Step S6-7': using, by the smart POS device, a compression algorithm to compress the pixel data, writing a compressing result in a newly created compression file, writing the compression file in the position after the mirror file header data structure in the mirror file;

Step S6-8': using, by the smart POS device, a stored signing public key to sign the mirror file header data structure and the compressed file in the mirror file, writing a signing result in the space with the preset size in the mirror file and storing the mirror file obtained finally.

8. The method according to claim 1, wherein there are more than one startup screens, StepS5 includes: verifying, by the smart POS device, completeness of the startup screen obtained by successful decrypting, if verifying is successful, executing StepS6, otherwise, verifying is failed, reporting an error;

StepS6 comprises:

StepS6-0: converting, by the smart POS device, format of the startup screen to a raw data format in turn to obtain screen data;

Step S6-1: parsing, by the smart POS device, the screen data to obtain screen information header and screen information data in turn; determining whether the startup screen meets a requirement according to the screen information header and the system information, if yes, executing StepS6-2, otherwise, ending;

StepS6-2: determining, by the smart POS device, whether the screen information data is compressed in turn, if yes, executing StepS6-3, otherwise, executing StepS6-4;

Step6-3: decompressing, by the smart POS device, the screen information data according to a compression type in the screen information header in turn, acquiring pixel data from a decompressing result according to a size of a raw pixel data file in the screen information header, executing StepS6-5;

StepS6-4: acquiring, by the smart POS device, pixel data from the screen information data according to a size of a raw pixel data file in file header information and a preset acquiring rule in turn, executing StepS6-5;

StepS6-5: creating, by the smart POS device, a mirror file of the startup screen, StepS6-6: creating, by the smart POS device, a signature structure and writing the signature structure in a header of the mirror file;

StepS6-7: creating, by the smart POS device, description structures, filling the description structures with screen information including total number of screens and description information of each screen, writing the description structures in turn at a position after the signature structure in the mirror file;

Step S6-8: concatenating, by the smart POS device, all pixel data according to a preset order, using a compression algorithm to compress a concatenating result, writing a compressing result in a newly created compression file;

Step S6-9: writing, by the smart POS device, the compression file at a position after the description structure in the mirror file in turn;

StepS6-10: using, the smart POS device, a stored signing public key to sign the description structures and the compression file in the mirror file, writing a signing result in the signature structure in the mirror file and storing the mirror file obtained finally.

9. The method according to claim 1, wherein before StepS4, the method further comprises:

StepF1: generating, by the smart POS device, a protection key and storing the protection key, using TLS certificate to verify an activating instruction when the smart POS device receives the activating instruction sent from a server, if verifying is successful, generating a successful activation response according to the protection key and the device information and sending the successful activation response to the server, parsing, by the server, the received successful activation response and storing the protection key and the device information obtained by parsing correspondingly;

StepF2: when the server receives an updating triggering information of a user, sending, by the server, a startup screen updating request to the smart POS device; receiving, by the smart POS device, the startup screen updating request and sending system information to the server; converting, by the server, a format of the startup screen to a raw data format to obtain screen data after receiving the system information, acquiring pixel data from the screen data, determining whether the stored startup screen matches the received system information according to the pixel data, if they are matched, performing, by the server, hash computation on the pixel data to obtain a pixel data hash value, encrypting the pixel data hash value and the pixel data by using the stored protection key corresponding to the received system information to obtain an image data ciphertext and sending the image data ciphertext to the smart POS device, if they are not matched, reporting an error;

StepS5 comprises: verifying, by the smart POS device, completeness of the pixel data obtained by successful decrypting, if verifying is successful, executing StepS6, if verifying is failed, reporting an error;

StepS6 specifically is: using, by the smart POS device, the pixel data to generate a mirror file of a startup screen and storing the mirror file.

10. The method according to claim 9, wherein using the stored protection key corresponding to the received system information to encrypt the startup screen hash value and the startup screen to obtain an image data ciphertext specifically is: searching for, by the server, device information according to the system information, acquiring a corresponding protection key according to the found device information, using the acquired protection key to encrypt the pixel data hash value and the pixel data with an encrypting algorithm to obtain the image data ciphertext.

11. The method according to claim 9, wherein the acquiring the pixel data from the screen data comprises:

StepH1: parsing, by the server, the screen data to obtain screen information header and screen information data, determining whether the pixel data meets a requirement according to the screen information header and the system information, if yes, executing StepH1, otherwise, reports an error;

StepH2: determining, by the server, whether the screen information data is compressed, if yes, executing StepH3, otherwise, executing StepH4;

StepH3: decompressing, by the server, the screen information data according to the compression type in the screen information header, acquiring pixel data from a decompressing result according to a size of a raw pixel data file in the screen information header;

StepH4: acquiring, by the server, pixel data from the screen information according to size of a raw pixel data file in the file header information.

12. The method according to claim 9, there are more than one startup screens;

converting the format of the startup screen to a raw data format to obtain screen data, acquiring pixel data from the screen data comprises:

StepK1: converting, the server, the format of each startup screen to the raw data format to obtain screen data in turn, taking the first screen data as current screen data;

StepK2: parsing, by the server, the current screen data to obtain a corresponding screen information header and screen information data, determining whether the current startup screen meets a requirement according to the screen information header and the system information, if yes, executing StepK3, otherwise, ending;

StepK3: determining, by the server, whether the screen information data is compressed, if yes, executing StepK4, otherwise, executing StepK5;

StepK4: decompressing, by the server, the screen information data according to a compression type in the screen information header, acquiring pixel data of current screen from a decompressing result according to size of a raw pixel data file in the screen information header, executing StepK6;

StepK5: acquiring, by the server, pixel data of the current screen form the screen information data according to size of a raw pixel data file in file header information and a preset acquiring rule, executing StepK6;

StepK6: determining, by the server whether the screen data is processed completely, if yes, keeping on processing, otherwise, taking next screen data as current screen data, going back to StepK2.

13. The method according to claim 1, wherein StepS5 comprises: verifying, by the Smart POS device, completeness of the pixel data acquired by successful decrypting, if verifying is successful, executing StepS6, otherwise, verifying is failed, reporting an error;

StepS6 comprises:

StepS61': creating, by the smart POS device, a mirror file of the startup screen, setting a space with a preset size at the beginning position of the mirror file;

StepS62': filling, by the smart POS device, a mirror file header data structure with screen description information, writing the mirror file header data structure in position after the space with the preset size in the mirror file;

StepS63': using, by the smart POS device, a compression algorithm to compress the pixel data, writing a compressing result in a newly created compression file, writing the compression file in the position after the mirror file header data structure in the mirror file;

StepS64': using, by the smart POS device, a stored signing public key to sign the mirror file header data structure and the compressed file in the mirror file, writing a signing result in the space with preset size in the mirror file and storing the finally obtained mirror file.

14. The method according to claim 9, wherein StepS5 comprises: verifying, by the Smart POS device, completeness of the pixel data acquired by successful decrypting, if verifying is successful, executing StepS6, otherwise, verifying is failed, reporting an error;

StepS6 comprises:

Step S61: creating, by the smart POS device, a mirror file of a startup screen;

Step S62: creating, by the smart POS device, a signature structure and writing the signature structure in a header of the mirror file;

StepS63: creating, by the smart POS device, description structures, acquiring total number of screens and description information of each screen from the decrypting result, filling the description structure with screen information which includes total number of screen and description information of each screen, writing the description structure in turn at a position after the signature structure in the mirror file;

Step S64: according to a preset order, concatenating, by the smart POS device, all pixel data obtained by decrypting, using a compression algorithm to compress a concatenating result and writing a compressing result in a newly created compression file;

Step S65: writing, by the smart POS device, the compression file at a position after the description structure in the mirror file in turn;

Step S66: using, by the smart POS device, a stored signing public key to sign the description structures and the compression file in the mirror file, writing a signing result in the signature structure in the mirror file, stores the mirror file obtained finally.

15. The method according to claim 1, wherein before StepS4, the method further comprises:

StepQ1: generating, by the smart POS device, a protection key and storing the protection key, using a TLS certificate to verify an activating instruction when receiving the activating instruction sent from a server, if verifying is successful, generating a successful activation response according to the protection key and device information and sending the successful activation response to the server, parsing, by the server, the received successful activation response and correspondingly storing the protection key and the device information obtained by parsing;

StepQ2: when the server receives an updating triggering information of a user, sending, by the server, a startup screen updating request to the smart POS device; receiving, by the smart POS device, the startup screen updating request and sending the system information to the server; converting, by the server, a format of a startup screen to a raw data format to obtain screen data after receiving the system information, acquiring pixel data from the screen data, determining whether the stored startup screen matches the received system information according to the pixel data, if they are matched, generating, by the server, a mirror file of the startup screen according to the pixel data, performing hash computation on the mirror file to obtain a mirror file hash value, encrypting the mirror file hash value and the mirror file by using the protection key corresponding to the system information to obtain image data ciphertext and sending the image data ciphertext to the smart POS device, if they are not matched, reporting an error;

StepS5 comprises: verifying, by the Smart POS device, completeness of the mirror file acquired by successful decrypting, if verifying is successful, executing StepS6, if verifying is failed, reporting an error;

StepS6 is replaced to be: storing, by the smart POS device, the mirror file acquired by successful decrypting.

16. The method according to claim 15, further comprising: when the server determines that the stored startup screen does not match screen display resolution in the received system information, or determines that a structure for making the mirror file matches a CPU manufacturer and the stored startup screen does not match the screen display resolution in the system information, adjusting, by the server, pixels of the pixel data according to the screen display resolution in the system information, generating a mirror file of the startup screen according to the adjusted pixel data, performing hash computation on the mirror file to obtain a mirror file hash value, encrypting the mirror file hash value and the mirror file by using the protection key corresponding to the system information to obtain an image data ciphertext and sending the image data ciphertext to the smart POS device.

17. The method according to claim 15, wherein encrypting the mirror file hash value and the mirror file by using the protection key corresponding to the system information to obtain image data ciphertext comprises: searching for the device information according to the system information, acquiring the corresponding protection key according to the device information, encrypting the mirror file hash value and the mirror file by using the acquired protection key to via an encrypting algorithm to obtain the image data ciphertext.

18. The method according to claim 15, wherein the acquiring pixel data from the screen data comprises:
StepA1: parsing the screen data to obtain a screen information header and screen information data; determining whether the startup screen meets a requirement according to the screen information header and the system information, if yes, executing StepA2, otherwise, ending;
StepA2: determining whether the screen information data is compressed, if yes, executing StepA3, otherwise, executing StepA4;
StepA3: decompressing the screen information data according to a compression type in the screen information header, acquiring the pixel data from a decompressing result according to size of a raw pixel data file in the screen information header;
StepA4: acquiring the pixel data from the screen information data according to size of a raw pixel data file in file header information;
the generating a mirror file of the startup screen according to the pixel data comprises:
StepB1: creating a mirror file of the startup screen, setting a space with a preset size at a beginning position of the mirror file;
StepB2: filling the mirror file header data structure according to screen description information, writing the mirror file header data structure in a position after the space with the preset size in the mirror file;
StepB3: compressing the pixel data by using a compression algorithm, writing a compressing result in a newly created compression file, writing the compression file in a position after the mirror file header data structure in the mirror file;
StepB4: using a stored signing public key to sign the mirror file header data structure and the compressed file in the mirror file, writing a signing result in the space with the preset size in the mirror file and storing the finally obtained mirror file.

19. A smart POS device, comprising at least one processor, a storage and an instruction which is stored in the storage and executed by the at least one processor, wherein the at least one processor executes the instruction to implement the method of claim 1.

20. A non-transitory computer readable storage medium, comprising a computer program, wherein when the computer program runs on a smart POS device, the smart POS device performs the method of claim 1.

* * * * *